(12) United States Patent
Boss et al.

(10) Patent No.: US 11,072,525 B2
(45) Date of Patent: Jul. 27, 2021

(54) SYSTEM AND METHOD FOR SUPPLYING A LIGHTER-THAN-AIR VEHICLE WITH HYDROGEN GAS

(71) Applicant: The United States of America as represented by the Secretary of the Navy, San Diego, CA (US)

(72) Inventors: Pamela A. Boss, San Diego, CA (US); Gregory W. Anderson, San Diego, CA (US); Brandon J. Wiedemeier, San Diego, CA (US); Carol A. Becker, Del Mar, CA (US); Brooke Bachmann, San Diego, CA (US); Mark Gillcrist, San Diego, CA (US); Jeffrey M. Lloyd, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 633 days.

(21) Appl. No.: 15/630,565

(22) Filed: Jun. 22, 2017

(65) Prior Publication Data
US 2017/0369142 A1     Dec. 28, 2017

Related U.S. Application Data

(60) Provisional application No. 62/353,723, filed on Jun. 23, 2016.

(51) Int. Cl.
*C01B 3/06* (2006.01)
*B01J 7/00* (2006.01)
(Continued)

(52) U.S. Cl.
CPC ............... *C01B 3/065* (2013.01); *B01J 7/00* (2013.01); *B64B 1/58* (2013.01); *B64B 1/62* (2013.01);
(Continued)

(58) Field of Classification Search
CPC .................................. B64B 1/62; B64B 1/64
See application file for complete search history.

(56) References Cited

U.S. PATENT DOCUMENTS 2,721,789 A * 10/1955 Gill ........................... C01B 3/10
422/202
5,423,247 A    6/1995 Rodrigues-Ely
(Continued)

OTHER PUBLICATIONS

Boss, P.A.; Becker, C.A.; Anderson, G.W.; Wiedemeier, B.J. "Laboratory Studies of Hydrogen Gas Generation Using the Cobalt Chloride Catalyzed Sodium Borohydride-Water Reaction." Spawar Systems Center Pacific Technical Report 2082, Jul. 2015.
(Continued)

*Primary Examiner* — Richard R. Green
(74) *Attorney, Agent, or Firm* — Naval Information Warfare Center, Pacific; Kyle Eppele; James R. McGee

(57) ABSTRACT

A system for supplying hydrogen gas to a lighter-than-air (LTA) vehicle includes a manifold having multiple vessels. Each vessel has a first chamber that is separated from a second chamber by a barrier. A trigger assembly integrated with the barrier allows a liquid to be combined with a reactant and a catalyst in the second chamber to form a chemical reaction to generate hydrogen gas. A pressure relief valve located on each vessel opens to allow the hydrogen gas to exit when a predetermined pressure is reached, and the hydrogen gas is supplied to the LTA vehicle connected to the manifold.

20 Claims, 26 Drawing Sheets

(51) Int. Cl.
  *B64B 1/58* (2006.01)
  *B64B 1/62* (2006.01)
  *B64B 1/64* (2006.01)
  *B01J 27/128* (2006.01)

(52) U.S. Cl.
  CPC ............... *B64B 1/64* (2013.01); *B01J 27/128* (2013.01); *B01J 2523/821* (2013.01); *B01J 2523/822* (2013.01); *B01J 2523/845* (2013.01); *Y02E 60/36* (2013.01)

(56) References Cited

U.S. PATENT DOCUMENTS

| | | | |
|---|---|---|---|
| 7,261,749 B2* | 8/2007 | Pettit | C01B 3/382 |
| | | | 422/211 |
| 7,306,780 B1 | 12/2007 | Kravitz et al. | |
| 7,763,087 B2* | 7/2010 | Hajiaghajani | G05B 9/02 |
| | | | 422/108 |
| 8,187,348 B2* | 5/2012 | Eickhoff | C01B 3/065 |
| | | | 423/644 |
| 8,240,602 B1 | 8/2012 | Lloyd et al. | |
| 8,771,634 B1 | 7/2014 | Becker et al. | |
| 8,926,866 B2* | 1/2015 | Kim, II | C01B 3/384 |
| | | | 423/556 |
| 9,005,321 B2* | 4/2015 | Barton | H01M 8/0606 |
| | | | 48/61 |
| 9,102,528 B2* | 8/2015 | Wallace | C01B 3/06 |
| 9,214,683 B2* | 12/2015 | Eickhoff | H01M 8/04201 |
| 9,266,727 B2* | 2/2016 | Stimits | H01M 8/04208 |
| 2005/0036941 A1* | 2/2005 | Bae | B01J 7/02 |
| | | | 423/658.2 |
| 2008/0014481 A1 | 1/2008 | Fiebig | |
| 2009/0050522 A1* | 2/2009 | Barber | C01B 13/0214 |
| | | | 208/64 |
| 2011/0033342 A1 | 2/2011 | Horiguchi | |
| 2011/0070151 A1 | 3/2011 | Braithwaite | |
| 2013/0028809 A1 | 1/2013 | Barton | |
| 2013/0036736 A1 | 2/2013 | Hart | |
| 2013/0244128 A1 | 9/2013 | Barton | |
| 2014/0050625 A1 | 2/2014 | Zheng | |
| 2014/0140919 A1 | 5/2014 | Langan | |
| 2017/0369310 A1* | 12/2017 | Wiedemeier | B64B 1/64 |

OTHER PUBLICATIONS

Mosier-Boss, P.A.; Becker, C.A.; Anderson, G.W.; Wiedemeier, B.J. "Feasibility Studies of the NaBH4/H20 Hydrolysis to Generate Hydrogen Gas to Inflate Lighter than Air (LTA) Vehicles." Ind. Eng. Chem. Res. 2015, 54, 7706-7714.

"Proportional and Derivative Control." MIT OpenCourseWare 2011. http://ocw.mit.edu/courses/electrical-engineering-and-computer-science/6-003-signals-and-systems-fall-2011/readings/MIT6_03F11_chap8.pdf.

Ferreira, M.J.F.; Gales, L.; Fernandes, V.R.; Rangel, C.M.; Pinto, A.M.F.R. "Alkali Free Hydrolysis of Sodium Borohydride for Hydrogen Generation Under Pressure." Int. J. Hydrogen Energy 2010. doi:10.1016/j.ijhydene.2010.02.121.

"PID Theory Explained." National Instruments White Paper, Mar. 29, 2011. http://www.ni.com/white-paper/3782/en/.

Becker-Glad et al., Acid Acceleration of Hydrogen Generation Using Seawater as a Reactant, International Journal of Hydrogen Energy (2016), http://dx.doi.org/10.1016/j.ijhydene.2016.02.132.

Schlesinger, Herbert E. et al., Sodium Borohydride, Its Hydrolysis and its Use as a Reducing Agent and in the Generation of Hydrogen, J. Am. Chem. Soc. 75(1): 215-219.

* cited by examiner

1100

- 1110 — PROVIDING A MANIFOLD HAVING A PLURALITY OF VESSELS, WHEREIN EACH VESSEL INCLUDES A FIRST CHAMBER SEPARATED FROM A SECOND CHAMBER BY A BARRIER

- 1120 — OPENING A TRIGGER ASSEMBLY INTEGRATED WITH THE BARRIER TO ALLOW A LIQUID TO PASS INTO THE SECOND CHAMBER FROM THE FIRST CHAMBER AT A DESIRED TIME, WHEREIN THE LIQUID COMBINES WITH A REACTANT AND A CATALYST IN THE SECOND CHAMBER TO FORM A CHEMICAL REACTION GENERATING HYDROGEN GAS

- 1130 — DETERMINING, VIA A CONTROLLER CONNECTED TO A PLURALITY OF TEMPERATURE SENSORS WITHIN EACH VESSEL, THAT A TEMPERATURE WITHIN EACH VESSEL IS MOVING OUTSIDE A DESIRED TEMPERATURE RANGE

- 1140 — ACTIVATING A PUMP, VIA THE CONTROLLER, TO CIRCULATE COOLING LIQUID THROUGH AT LEAST ONE THERMAL REGULATOR WITHIN EACH SECOND CHAMBER TO KEEP THE TEMPERATURE WITHIN THE DESIRED TEMPERATURE RANGE

- 1150 — OPENING A PRESSURE RELIEF VALVE DISPOSED ON EACH VESSEL TO ALLOW THE HYDROGEN GAS TO EXIT WHEN A PREDETERMINED PRESSURE IS REACHED

- 1160 — CONNECTING A LIGHTER-THAN-AIR (LTA) VEHICLE TO THE MANIFOLD TO SUPPLY THE LTA VEHICLE WITH THE HYDROGEN GAS

FIG. 11

| % CoCl$_2$ catalyst[a] | T of water baths (°C)[b] | Height of Control T$_C$ or T$_{TH}$ (in)[c] | Height of T$_2$-T$_4$ (in)[c] | Set T (°C) | Time to Initial Set T (min) | Reaction Time (min) |
|---|---|---|---|---|---|---|
| 2.76 (FIG. 24) | 15 | T$_C$=10 | T$_1$=16 T$_2$=18 T$_3$=22 | 30, then step to 32, 34, 36, 38, 40, 42, 44, 46, 48, 50, 55 | 0.5 | 52.4 |
| 2.25 (FIG. 14) | 15 | T$_C$=6 | T$_1$=16 T$_2$=18 T$_3$=22 | 45, then step to 55 when 13.7 min into the reaction | 4 | 28.7 |
| 2.25 | 15 | T$_C$=6 | T$_1$=16 T$_2$=18 T$_3$=22 | 50, then step to 55 when 10.3 min into the reaction | 5 | 21.5 |
| 2.25 (FIG. 15) | 15 | T$_C$=6 | T$_1$=16 T$_2$=18 T$_3$=22 | ramp 42 to 57 with no derivative | 3.7 | 29.9 |
| 2.25 (FIG. 16) | 15 | T$_C$=6 | T$_1$=-1.1 T$_2$=16 T$_3$=22 | ramp 42 to 57 with derivative | 2.7 | 27.7 |
| 2.25 | 15 | T$_C$=6 | T$_1$=3 T$_2$=16 T$_3$=18 | ramp 42 to 57 with derivative | 3.9 | 28.4 |
| 2.25 (FIG. 25) | 25 | T$_C$=6 | T$_1$=10 T$_2$=16 T$_3$=18 | 45 step to 50 when 11.7 min into reaction, 55 when 21.4 min into reaction | 2.2 | 26 |
| 2.25 (FIG. 17) | 25 | T$_C$=6 | T$_1$=-1.1 T$_2$=16 T$_3$=22 | ramp 42 to 57 with derivative | 1.5 | 29 |
| 2.25 (FIG. 18) | 0 | T$_C$=6 | T$_1$=-1.1 T$_2$=16 T$_3$=22 | ramp 42 to 57 with derivative | 13.8 | 31.7 |
| 2.25 (FIG. 19) | 15 | T$_{TH}$=6 | T$_1$=-1.1 T$_2$,T$_3$=6 T$_4$=21 | ramp 42 to 57 with derivative | 2.7 | 26.7 | a. % CoCl$_2$ is relative to the mass of NaBH$_4$.
b. The hydrogen generation unit, cooling water, and hose are in drums or containers maintained at a given temperature.
c. Height of the control thermocouple (T$_C$) or thermistor (T$_{TH}$) is relative to the perforated bottom plate

FIG. 26

SYSTEM AND METHOD FOR SUPPLYING A LIGHTER-THAN-AIR VEHICLE WITH HYDROGEN GAS

CROSS-REFERENCE TO RELATED APPLICATION

This application claims the benefit of U.S. Provisional Application No. 62/353,723, filed 23 Jun. 2016, entitled "Method for Interactive Automatic Controlled Generation of Hydrogen to Inflate Lighter Than Air Vehicles."

FEDERALLY-SPONSORED RESEARCH AND DEVELOPMENT

The System and Method for Supplying a Lighter-Than-Air Vehicle with Hydrogen Gas is assigned to the United States Government. Licensing inquiries may be directed to the Office of Research and Technical Applications, Space and Naval Warfare Systems Center Pacific, Code 72120, San Diego, Calif. 92152. Phone: (619) 553-5118; email: ssc_pac_t2@navy.mil. Reference Navy Case No. 103431.

BACKGROUND

An increase in worldwide manufacturing processes using helium has correspondingly increased the demand for helium. Since helium is a non-renewable source, this increased use in manufacturing has led to decreased helium supplies and a corresponding increase in costs. At the same time, the use of lighter-than-air (LTA) vehicles for military and commercial applications has increased. Traditionally, LTA vehicles have been inflated using helium; however, with the rising costs and scarcity of helium, the use of hydrogen gas to inflate LTA vehicles is gaining greater acceptance.

BRIEF DESCRIPTION OF THE DRAWINGS

The elements in the figures may not be drawn to scale. Some elements and/or dimensions may be enlarged to provide emphasis or further detail.

FIG. 11 shows a flowchart of an embodiment of a method in accordance with the System and Method for Supplying a Lighter-Than-Air Vehicle with Hydrogen Gas.

FIG. 26 shows a table of the experimental conditions pertaining to some of the graphical results shown in FIGS. 12-25.

DETAILED DESCRIPTION OF VARIOUS EMBODIMENTS

References in the specification to "one embodiment" or "an embodiment" means that a particular element, feature, structure, or characteristic described in connection with the embodiments is included in at least one embodiment. The appearances of the phrases "in one embodiment", "in some embodiments," and "in other embodiments" in various places in the specification are not necessarily all referring to the same embodiment or the same set of embodiments.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

The embodiments disclosed herein describe a system and method suitable for generating hydrogen gas in order to, e.g., inflate an LTA vehicle or for using in hydrogen fuel cells. Focuses of the system and method include providing hydrogen generation vessels in a manifold assembly, storing hydrogen in a chemically dense form as a metal hydride, generating dry hydrogen gas at a controlled, constant rate, and supplying the hydrogen gas to an LTA vehicle.

Figure 1:
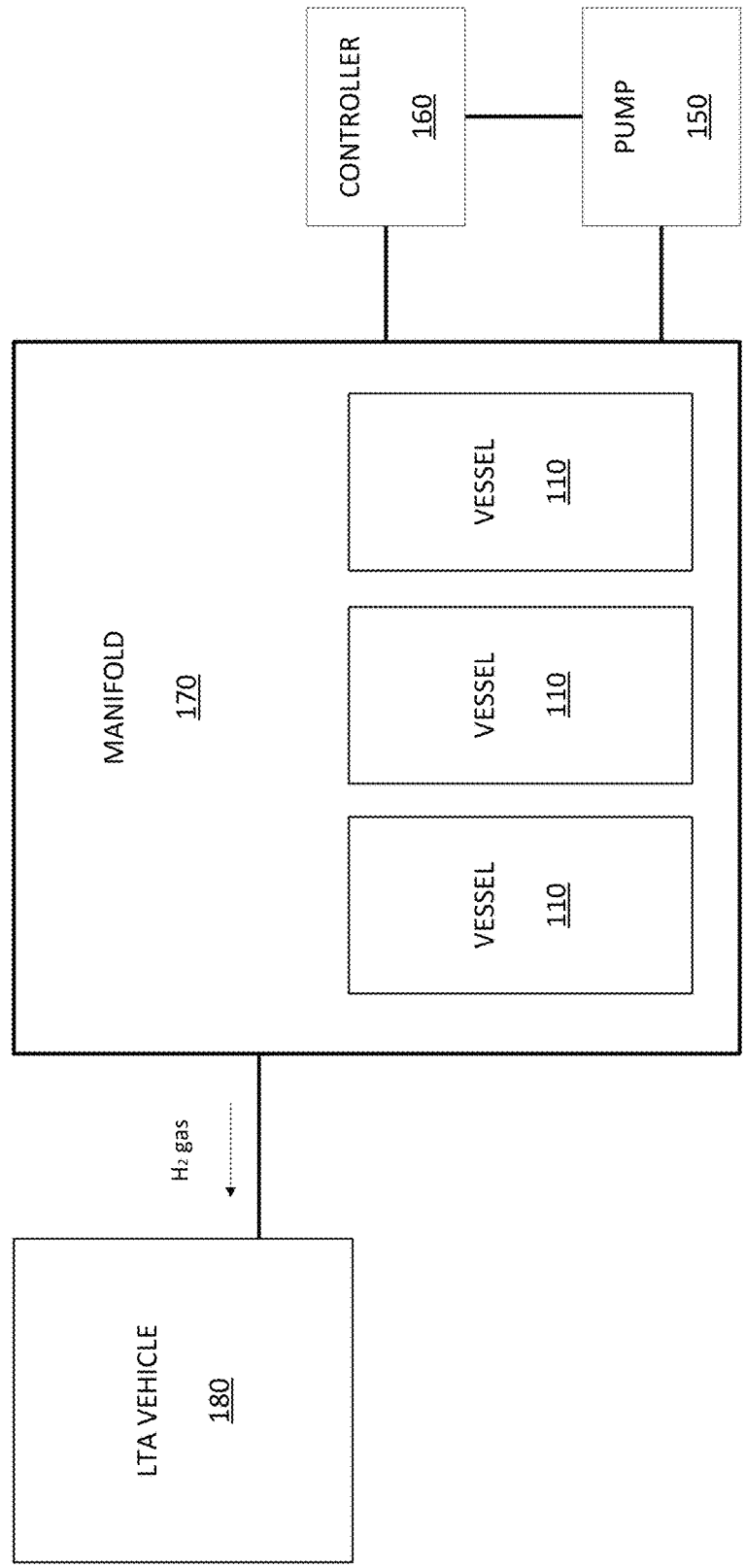
FIG. 1 is a functional block diagram of an embodiment of a system in accordance with the System and Method for Supplying a Lighter-Than-Air Vehicle with Hydrogen Gas.

FIG. 1 shows an example diagram illustrating an embodiment of a system 10 in accordance with the System and Method for Supplying a Lighter-Than-Air Vehicle with Hydrogen Gas. System 10 may include an LTA vehicle 180 and a manifold 170 having a plurality of hydrogen generation vessels 110. As an example, an LTA vehicle may be an aerostat, a balloon, etc.

Figure 2:
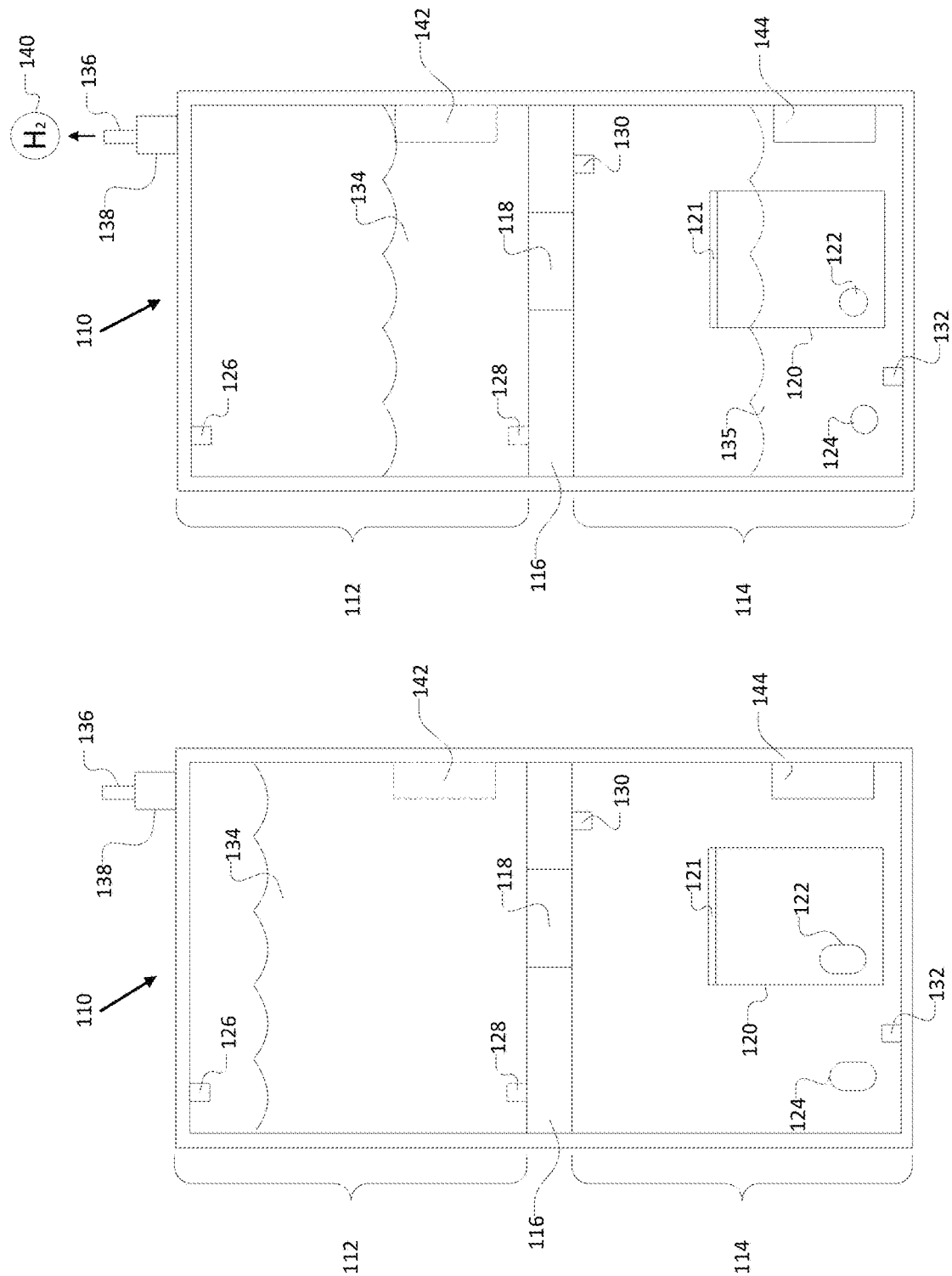
FIGS. 2A-2B are functional block diagrams of an embodiment of a vessel that may be utilized within the system shown in FIG. 1.

As shown in FIGS. 2A-2B, vessel 110 may have a first chamber 112 and a second chamber 114. First chamber 112 may be separated from second chamber 114 by a barrier 116 having a trigger assembly 118. Trigger assembly 118 may be integrated with barrier 116 and can be configured to open and close to allow and prevent a liquid (e.g., water) 134 from passing into second chamber 114 from first chamber 112. As an example, distilled or deionized water may be used, or seawater may be used if the dissolved organics and ammonia are removed before use. A reactant container 120 may be located in second chamber 114 and may hold a reactant 122. Reactant container 120 may be perforated on one or more sides and may have a lid 121 configured to inhibit the liquid from entering reactant container 120. Lid 121 may also direct liquid 134 to flow adjacent to a thermal regulator 144 in second chamber 114. A catalyst 124 may also present in second chamber 114.

The types of materials that may be used in construction of vessel 110 and manifold 170 are meant to withstand the temperatures and pressures generated during the chemical reaction. The materials are also chemically resistant to the reaction products. In some embodiments, such materials may include anodized aluminum, polytetrafluoroethylene-coated aluminum, copper, and polyvinyl chloride. In some embodiments, vessel 110 and/or manifold may be fabricated from aluminum and then given a polytetrafluoroethylene-impregnated, hard anodic coating. In some embodiments, vessel 110 may have a rounded, conical bottom-shape.

A plurality of temperature sensors 126, 128, 130, 132 may be positioned at various places within vessel 110. In some embodiments, the temperature sensors used may be thermocouples, thermistors, or resistance temperature detectors (RTDs). A smart temperature sensor having a temperature sensor and bias circuitry could also be used. No one configuration of the placement of temperature sensors within the vessel is controlling. For example, a sensor may be placed near the bottom of reactant container 120, which may have a perforated bottom plate (not shown), while other sensors may be placed on the upper walls of the various chambers within vessel 110 or at other locations within the various chambers.

Trigger assembly 118 may open at a desired or programmed time to allow liquid 134 to combine with reactant 122, and catalyst 124 (if present), in second chamber 114, as shown in FIG. 2B, to form a chemical reaction generating hydrogen gas 140. FIG. 2B, shows liquid 134 at a lower level in first chamber 112 because a portion has moved into second chamber 114 as shown by a dashed line for liquid 135. Reactant 122 and catalyst 124 are shown as decreased in size to indicate their combination with liquid 135 as part of the chemical reaction. In some embodiments, trigger assembly 118 may include a valve (not shown) and may be configured to open electronically. A pressure relief valve 136 may be disposed on vessel 110 and configured to open to allow hydrogen gas 140 to exit when a predetermined pressure is reached, and hydrogen gas 140 exiting vessels 110 of manifold 170 may be supplied to LTA vehicle 180 for inflation.

In some embodiments, pressure relief valve 136 may be located on a safety rupture disc 138 of vessel 110. Pressure relief valve 136 may aid in maintaining a minimum pressure to prevent reactant volume from exceeding the available vessel size. Pressure relief valve 136 may also provide a more consistent pressure for cooling and an output pressure for the gas product. The predetermined pressure may be a programmed pressure that is within the tolerance rating of the pressure relief valve used in the system. An example of a pressure relief valve is Circle Seal Controls 5-80-A-3MP-100, which is rated for 100 pounds per square inch (psi); however, other pressure relief valves may be utilized.

In embodiments where safety rupture disc 138 is located on vessel 110, it may prevent vessel 110 from over-pressurization during the hydrogen gas generation. An example of a safety rupture disc is the Fike Axius SC, which is rated for a burst pressure of 275 psi; however, other safety rupture discs may be utilized.

Manifold 170 may have interior plumbing (not shown) that connects vessels 110 and directs hydrogen gas 140 to a hose (not shown) connected to LTA vehicle 180 for purposes of inflation.

Reactant 122 may be a hydride capable of absorbing and desorbing hydrogen in both the hydrogen-depleted (dehydrided) and the hydrogen-rich (hydrided) states. In some embodiments, the hydride may be one of an alkali metal, alkaline earth hydrides, and hydrides of the group III metals, for example, hydrides of lithium, sodium, potassium, rubidium, cesium, beryllium, magnesium, calcium, aluminum, and combinations thereof. In some embodiments, the hydride used does not require a catalyst to be present and is also not affected by the dissolved organics and ammonia present in seawater, thus allowing the seawater to be used as-is. For example, the hydride may be one of LiH, NaH, KH, RbH, CsH, $MgH_2$, and $CaH_2$. In some embodiments, the hydride is a borohydride, which contains a significant amount of hydrogen on a weight percent basis. For example, the borohydride may be one of lithium borohydride, sodium borohydride, and magnesium borohydride. In some embodiments, the hydride may be one of, for example, $LiBH_4$, $NaBH_4$, $KBH_4$, $Mg(BH_4)_2$, $Ca(BH_4)_2$, $LiAlH_4$, $NaAlH_4$, $KAlH_4$, $Li_3AlH_6$, and $Na_3AlH_6$.

If present, catalyst 124 may be a substance involved in catalyzing the reaction of a hydride with a liquid such as water. Transition metals such as one of the precious metals, or other metals such as iron, cobalt, and nickel, or combinations thereof, are non-limiting examples of useful catalysts. In some embodiments, ruthenium, ruthenium chloride, or other $Ru^{3+}$ salts are useful catalysts. Soluble transition metal salts that can be reduced to pure metal by hydrides are also useful for generating finely divided metal particles that can serve as catalysts. In some embodiments, the catalyst may be one of, for example, Ruthenium Chloride, Rhodium Chloride, Cobalt Chloride, Nickel Chloride, and Chloroplatinic acid. In some embodiments, a catalyst such as an acidic accelerant may be used, which is not affected by the dissolved organics and ammonia present in seawater, thus allowing the seawater to be used as-is. For example, acidic accelerants such as Boric acid, Citric acid, Tartaric acid, and Acetic acid may be used.

As shown in FIG. 1, system 10 may include a pump 150 connected to a controller 160. Pump 150 may be activated by controller 160 to circulate a cooling liquid through thermal regulators 142 and 144 within each vessel 110. In some embodiments, pump 150 may be a submersible, centrifugal-well pump immersed in a cooling liquid. An example pump is Sun Pumps model SCS 43-70-105 BL; however, other pumps may be utilized. Pump 150 may be activated when a set temperature is reached within vessels 110. The set temperature may be detected by at least one of the plurality of temperature sensors 126, 128, 130, and 132, which are also connected to controller 160. As an example, the set temperature may be a single temperature (e.g., 30° C.), but this may vary depending on the particular system configurations. Also, the set temperature may be ramped as described below.

Figure 7:
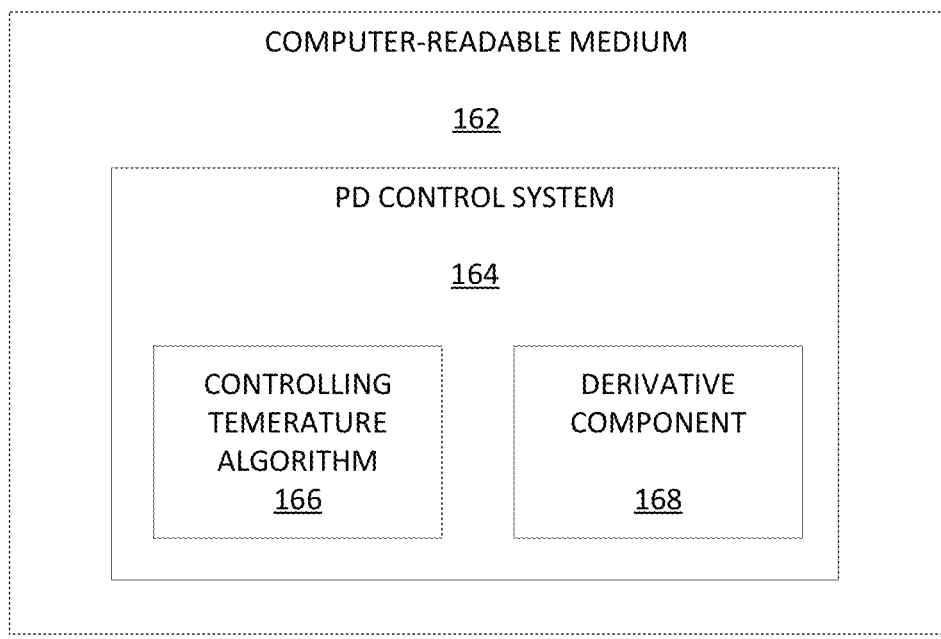
FIG. 7 is a function block diagram of an embodiment of a controller that may be utilized within the system shown in FIG. 1.

Controller 160 may regulate the temperature within vessels 110 utilizing pump 150 and thermal regulators 142 and 144. FIG. 7 shows an example diagram illustrating an embodiment of controller 160 shown in FIG. 1. Controller 160 may include a proportional and derivative (PD) control system 164 stored in a non-transitory computer readable medium 162. PD control system 164 may include a controlling temperature algorithm 166 and a derivative component 168.

As an example, PD control functions may include a closed feedback loop in which a process variable (e.g., temperature) needs to be controlled. A set point, which may be a selected value for the process variable, may be compared to a measured value of the process variable (e.g., a temperature sensor reading), and the difference between the set point and the process variable may be used to determine an output (e.g., turning the pump on/off as necessary) in order to decrease the difference between the set point and the process variable. The PD control functions may be performed by PD control system 164 and may include additional steps pertaining to proportional, integral, and derivative control.

In some embodiments, controller 160 may turn pump 150 on and off as necessary in attempt to regulate the temperatures within vessels 110 when the reaction reaches a set temperature as measured by at least one of temperature sensors 126, 128, 130, and 132. Controller 160 may use at least one of temperature sensors 126, 128, 130, and 132 to monitor the chemical reaction. A temperature profile may be used by controller 160 to ramp the set temperature by a certain number of degrees Celsius (e.g., 1° C.) at timed intervals (e.g., every 2 minutes), but the profile may vary depending on system configurations. The ramping may begin when the chemical reaction is activated. The set temperature may have over/undershoots that may be reduced by using PD control system 164 in addition to ramping the set temperature. This type of automated control may allow the temperatures within vessels 110 to remain within a desired range that is close to the set temperature without significant over/undershoots. For example, the set temperature may be 42° C. with over/undershoots of ±1 or 2° C.; therefore, the desired temperature range in this example may be 41-43 or 40-44° C. As an example, the set temperature may be ramped from 42-57° C., but this may vary depending on the particular system configurations.

Figure 3:
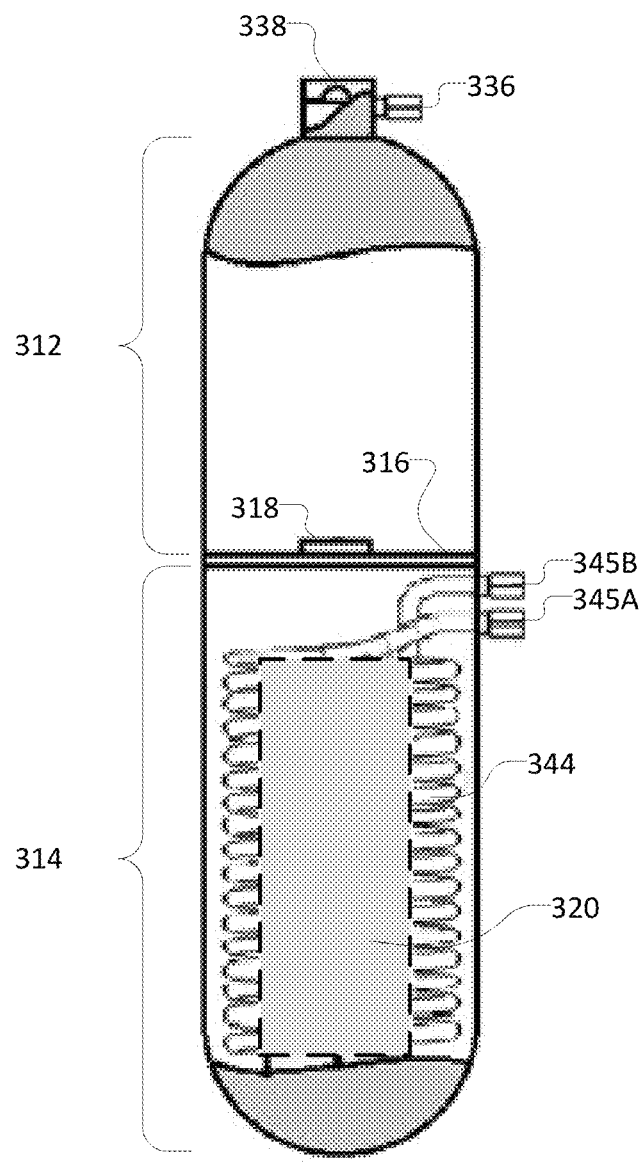
FIG. 3 shows an embodiment of a vessel that may be utilized within the system shown in FIG. 1.

FIG. 3 shows an embodiment of a vessel 310 that could be utilized in system 10. Components of vessel 310 that are substantially similar to components of vessel 110 may be similarly configured and may not be further described. Vessel 310 may include a first chamber 312, a second chamber 314, a barrier 316, a trigger assembly 318, a reactant container 320, a pressure relief valve 336, a safety rupture disc 338, a coil-shaped thermal regulator 344, coil inlet 345A, and coil outlet 345B. Thermal regulator 344 may be located in second chamber 314 and receive a cooling liquid via coil inlet 345A. Coil outlet 345B allows the cooling liquid to exit after it has circulated through thermal regulator 344. Other elements may be present but not shown (e.g., a plurality of temperature sensors, a reactant, a catalyst, a liquid, a lid, etc.).

Figure 4:
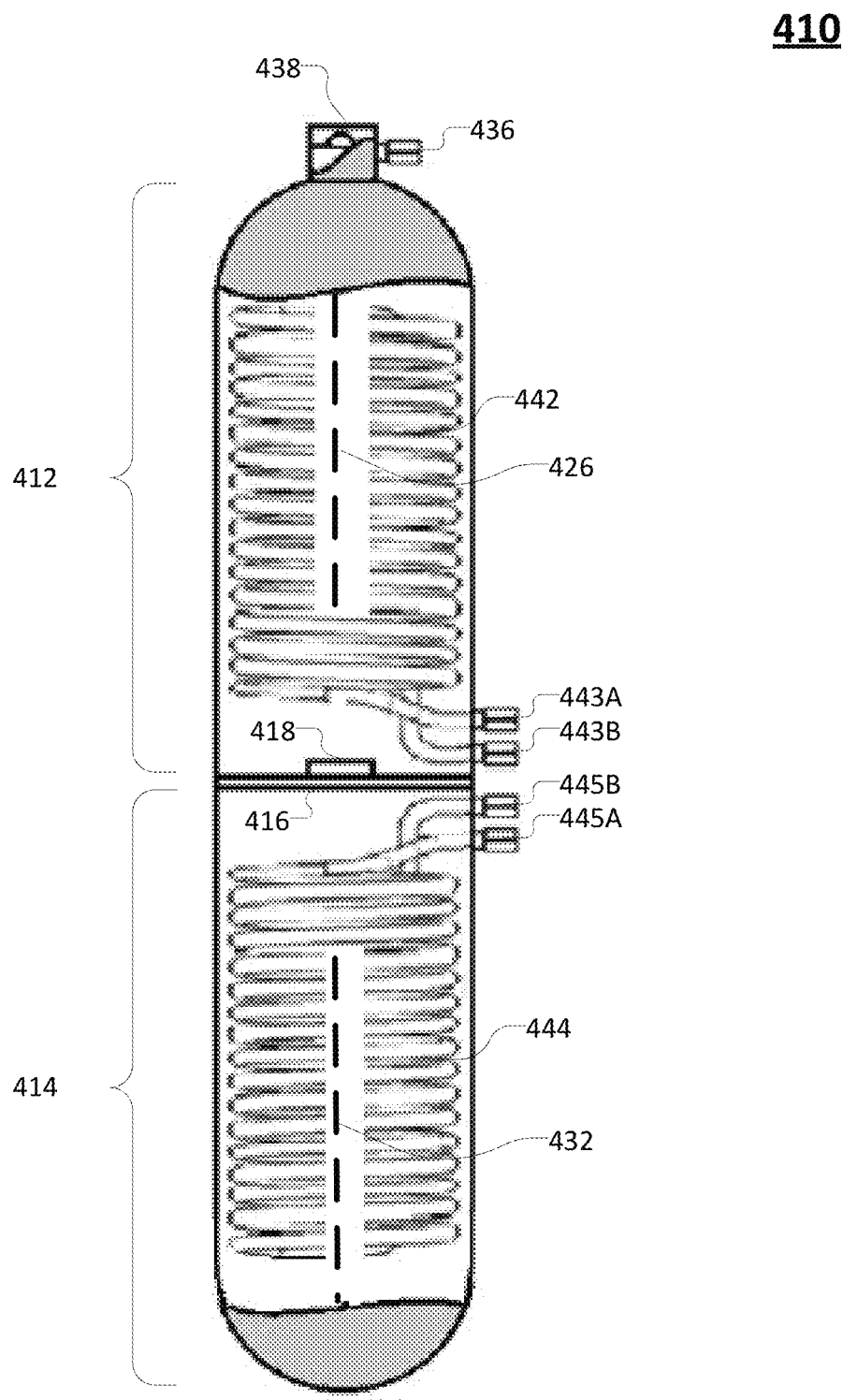
FIG. 4 shows an embodiment of a vessel that may be utilized within the system shown in FIG. 1.

FIG. 4 shows an embodiment of a vessel 410 that could be utilized in system 10. Components of vessel 410 that are substantially similar to components of vessel 110 may be similarly configured and may not be further described. Vessel 410 may include a first chamber 412, a second chamber 414, a barrier 416, a trigger assembly 418, temperature sensors 426 and 432, a pressure relief valve 436, and a safety rupture disc 438. A coil-shaped thermal regulator 442 may be located in first chamber 412 and receive a cooling liquid via a coil inlet 443A. A coil outlet 443B allows the cooling liquid to exit after it has circulated through thermal regulator 442. A coil-shaped thermal regulator 444 may be located in second chamber 414 and receive the cooling liquid via a coil inlet 445A. A coil outlet 445B allows the cooling liquid to exit after it has circulated through thermal regulator 444. Other elements may be present but not shown (e.g., a reactant, a catalyst, a liquid, a lid, etc.).

Figure 5:
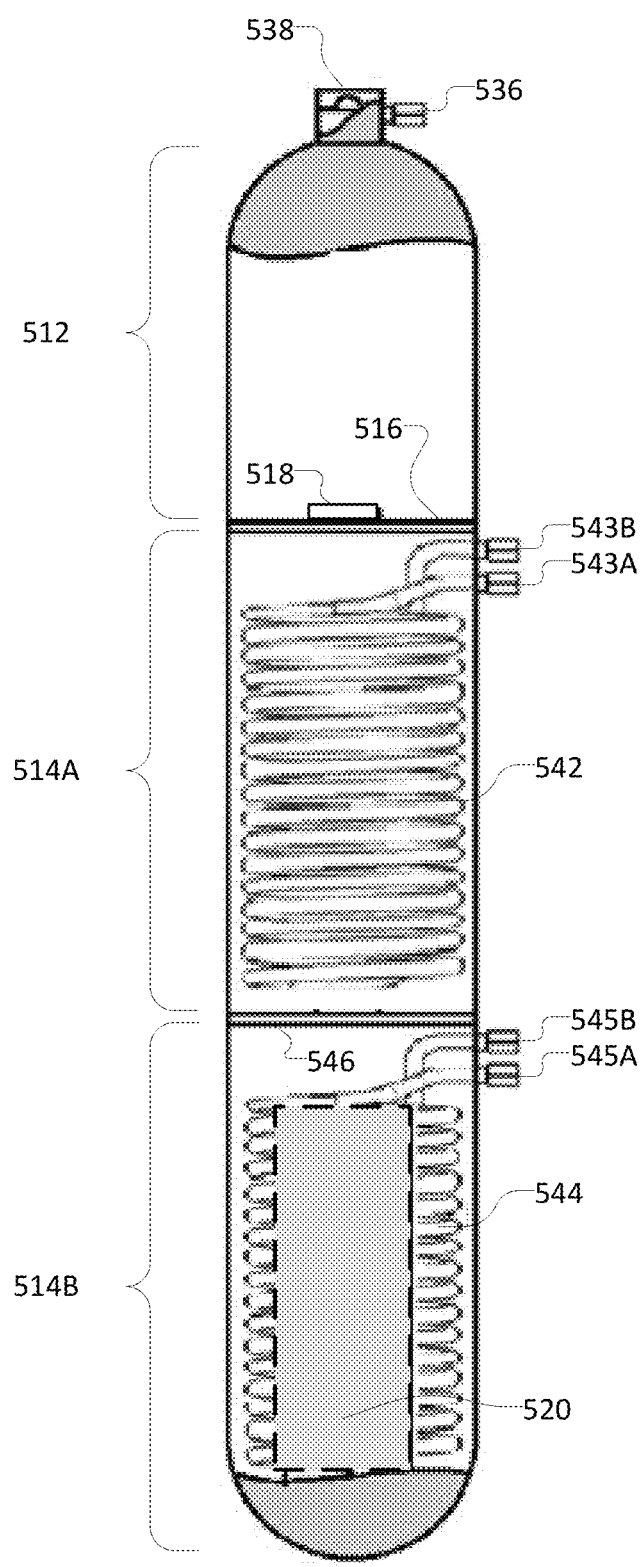
FIG. 5 shows an embodiment of a vessel that may be utilized within the system shown in FIG. 1.

FIG. 5 shows an embodiment of a vessel 510 that could be utilized in system 10. Components of vessel 510 that are substantially similar to components of vessel 110 may be similarly configured and may not be further described. Vessel 510 may include a first chamber 512, a second chamber 514A, a third chamber 514B, a barrier 516, a trigger assembly 518, a pressure relief valve 536, a safety rupture disc 538, and a plate 546 having an opening to allow substances to pass between the second chamber 514A and the third chamber 514B. A liquid may pass from first chamber 512 to second and third chambers 514A and 514B when trigger assembly 518 is opened. A coil-shaped thermal regulator 442 may be located in second chamber 514A and receive a cooling liquid via a coil inlet 543A. A coil outlet 543B allows the cooling liquid to exit after it has circulated through thermal regulator 542. A coil-shaped thermal regulator 544 may be located in third chamber 514B and receive the cooling liquid via a coil inlet 545A. A coil outlet 545B allows the cooling liquid to exit after it has circulated through thermal regulator 544. Other elements may be present but not shown (e.g., a plurality of temperature sensors, a reactant, a catalyst, a liquid, a lid, etc.).

Figure 6:
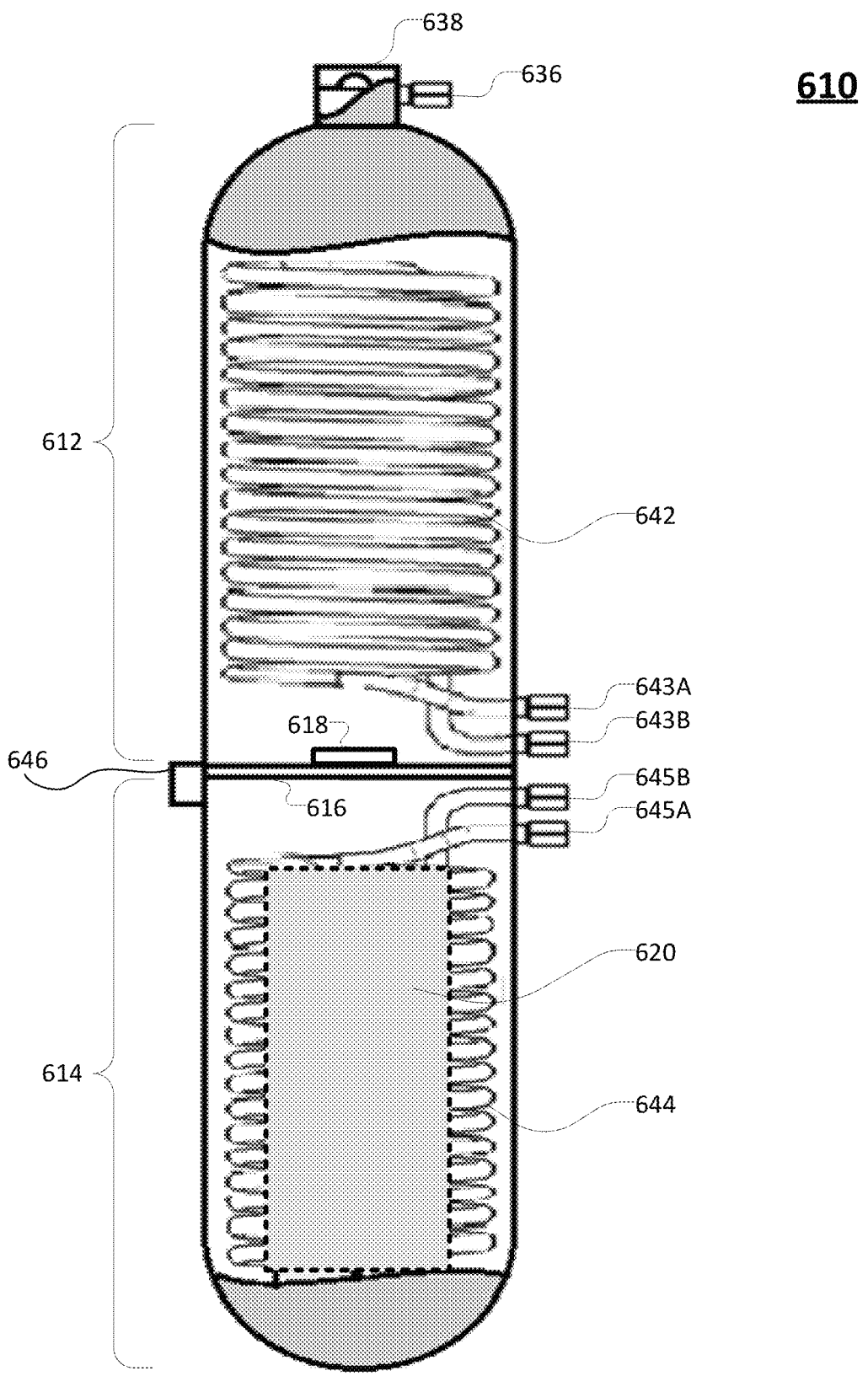
FIG. 6 shows an embodiment of a vessel that may be utilized within the system shown in FIG. 1.

FIG. 6 shows an embodiment of a vessel 610 that could be utilized in system 10. Components of vessel 610 that are substantially similar to components of vessel 110 may be similarly configured and may not be further described. A coil-shaped thermal regulator 642 may be located in a first chamber 612 and receive a cooling liquid via a coil inlet 643A. A coil outlet 643B allows the cooling liquid to exit after it has circulated through thermal regulator 642. A coil-shaped thermal regulator 644 may be located in second chamber 614 and receive the cooling liquid via a coil inlet 645A. A coil outlet 645B allows the cooling liquid to exit after it has circulated through thermal regulator 644. An electrical connector 646 may be located on vessel 610 and may be used to connect the plurality of temperature sensors (not shown) to the controller (not shown). Vessel 610 may also include a reactant container 620, a pressure relief valve 636, a safety rupture disc 638, a barrier 616, and a trigger assembly 618. Other elements may be present but not shown (e.g., a reactant, a catalyst, a liquid, a lid, etc.). As an example, FIG. 6 show that reactant container 620 may be located within an inner dimension of thermal regulator 644 such that it may be bordered by the thermal regulator 644.

In some embodiments, such as FIGS. 3-6, the thermal regulator(s) within the vessel may be coil-shaped. A coil-shaped thermal regulator may border or encircle the reactant container when both are located in the same chamber, such as shown in FIGS. 3,5, and 6. Other shapes of thermal regulators are possible and may be utilized within the vessel, e.g., a serpentine shape, a straight-tubed shape, a u-tubed shape, etc.

In some embodiments, a pressure transducer may be placed outside of the $H_2$ gas outlet (e.g., pressure relief valve 636) along with a temperature sensor in order to measure the temperature and pressure of the exiting hydrogen gas as it enters a hose. A flowmeter may be placed at the entrance end of the hose to measure gas flow rate, pressure, and temperature. A data logger may be placed at the exit end of the hose to measure temperature and relative percent humidity of the hydrogen gas. In some embodiments, data acquisition pertaining to the abovementioned instruments is performed under computer control (e.g., via controller 160).

Figure 8:
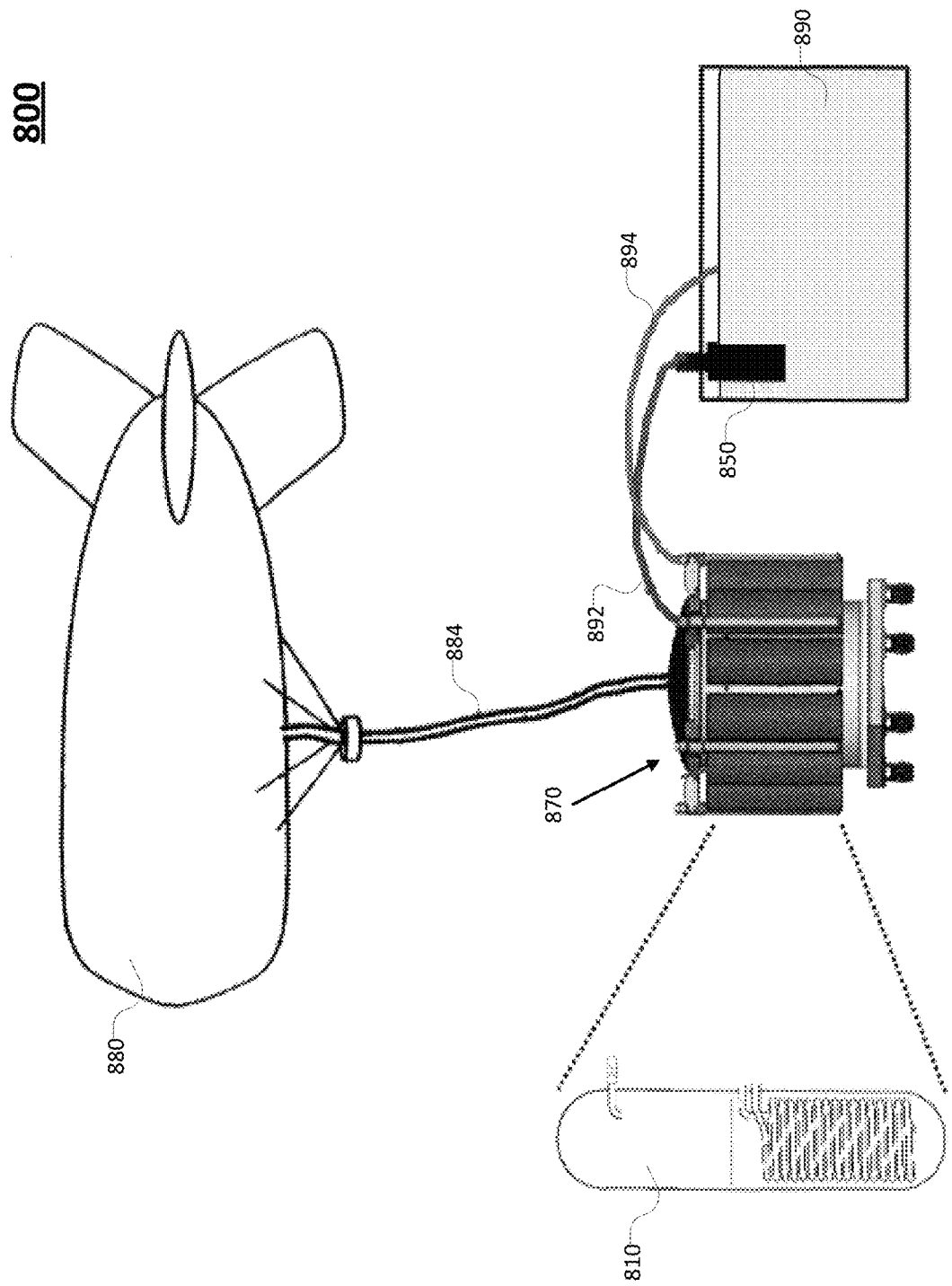
FIG. 8 shows an embodiment of a system in accordance with the System and Method for Supplying a Lighter-Than-Air Vehicle with Hydrogen Gas.

FIG. 8 shows an embodiment of a system 800 in accordance with the System and Method for Supplying a Lighter-Than-Air Vehicle with Hydrogen Gas. Components of system 800 that are substantially similar to components of system 10 may be similarly configured and may not be further described. System 800 may include an LTA vehicle 880 connected to a manifold 870 by a hose 884. Manifold 870 may include a plurality of vessels 810. A pump 850 may be submerged in cooling liquid 890 and supply cooling liquid 890 to manifold 870 via an inlet hose 892. An outlet hose 894 may allow cooling liquid 890 to exit manifold 890 after circulating through vessels 810. Manifold 870 may include a controller (not shown) in keeping with controller 160. As an example, vessels 810 may comprise any of the embodiments of vessels previously shown and described.

Figure 9:
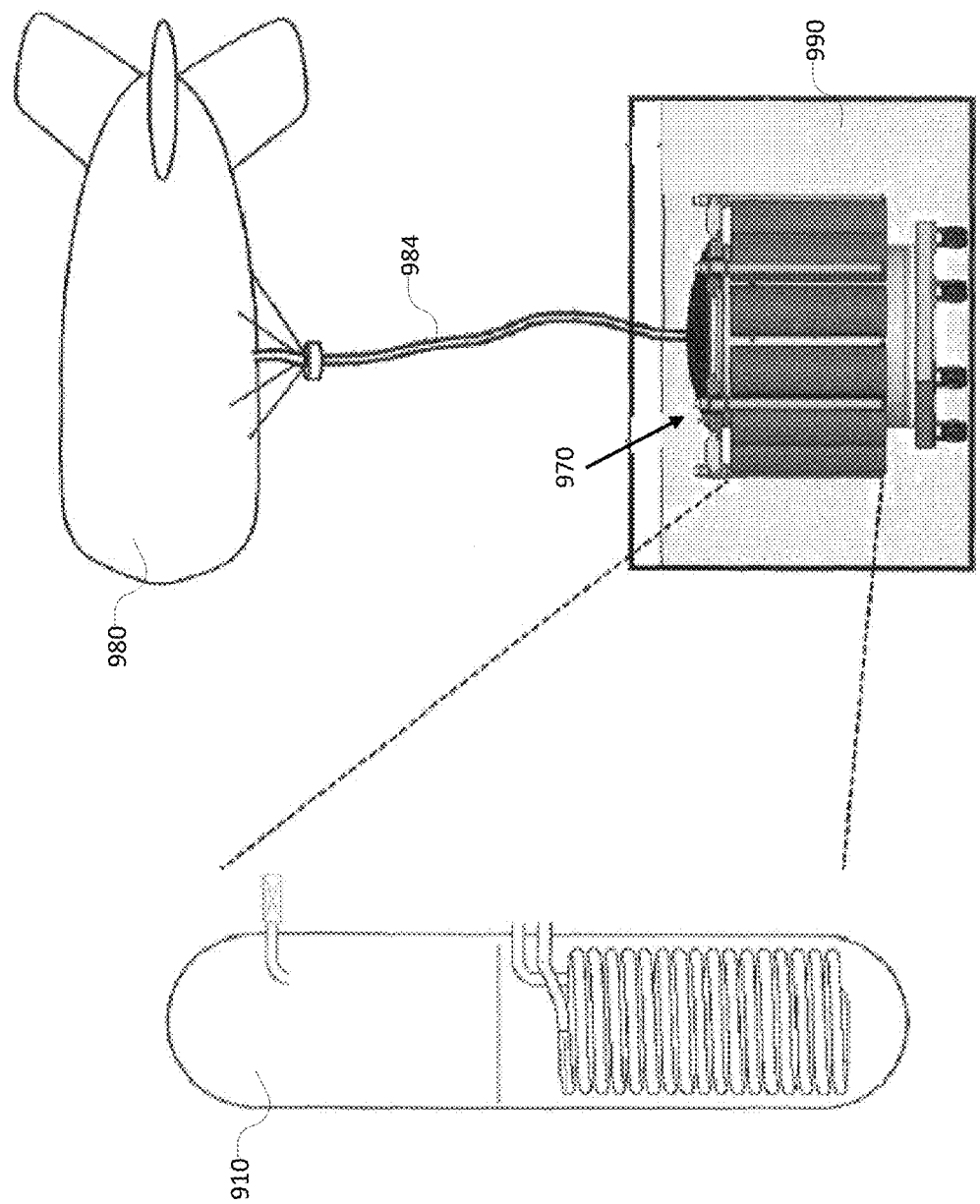
FIG. 9 shows an embodiment of a system in accordance with the System and Method for Supplying a Lighter-Than-Air Vehicle with Hydrogen Gas.

FIG. 9 shows an embodiment of a system 900 in accordance with the System and Method for Supplying a Lighter-Than-Air Vehicle with Hydrogen Gas. Components of system 900 that are substantially similar to components of system 10 may be similarly configured and may not be further described. System 900 may include an LTA vehicle 980 connected to a manifold 970 by a hose 984. Manifold 970 may include a plurality of vessels 910. Manifold 970 may be submerged in a cooling liquid 990 and may include a pump (not shown) a controller (not shown) in keeping with pump 150 and controller 160. As an example, vessels 910 may comprise any of the embodiments of vessels previously shown and described.

Figure 10:
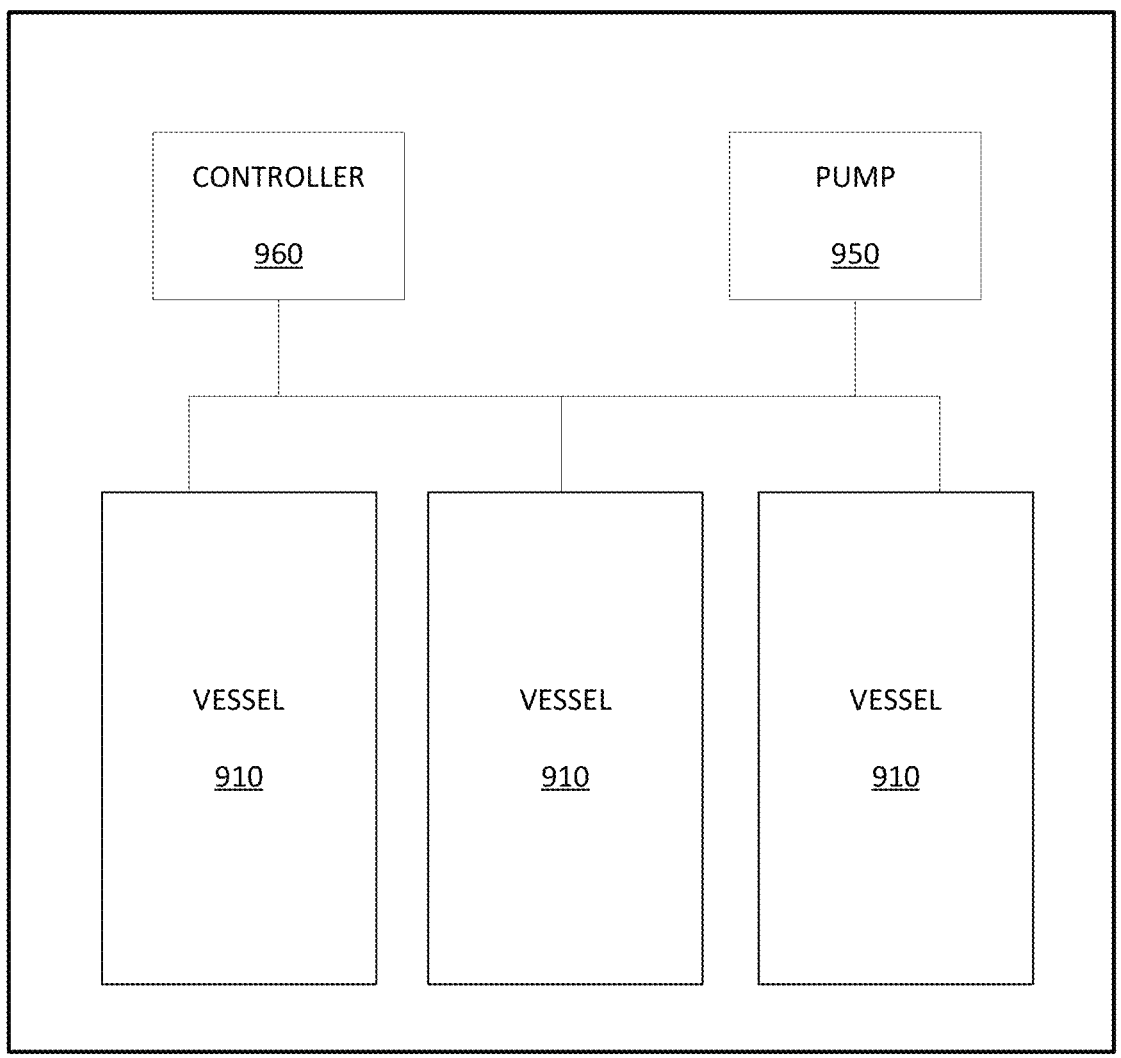
FIG. 10 is a functional block diagram of an embodiment of a manifold that may be utilized within the system shown in FIG. 9.

FIG. 10 is an example diagram illustrating an embodiment of manifold 970 shown in FIG. 9. In keeping with the above description of manifold 970, it may include a plurality of vessels 910, a pump 950, and a controller 960. Other elements may be present but not shown.

The embodiments of manifolds described herein may have interior plumbing that connects the vessels and directs the generated hydrogen gas to a hose connected to an LTA vehicle for purposes of inflation. In some embodiments, the interior plumbing may also connect the pump to the vessels for the purpose of circulating the cooling liquid, but this may vary depending on system configurations. For example, the interior plumbing may be configured differently depending on whether the pump is integrated with the manifold (e.g., FIGS. 9 and 10) or if the pump is separate from the manifold (e.g., FIG. 8). Additionally, interior electrical wiring may be present in the manifolds for connecting the vessels, the controller, and the pump as necessary for particular system configurations.

FIG. 11 shows a flowchart of an embodiment of a method 1100 in accordance with the System and Method for Supplying a Lighter-Than-Air Vehicle with Hydrogen Gas. Portions of method 1100 may be implemented as a series of modules, either functioning alone or in concert with physical electronic and computer hardware devices. Such modules may be utilized separately and/or together locally and/or remotely to form a program product thereof, which may be implemented through recordable media.

Some of the steps of method 1100 may be stored on a non-transitory computer readable storage medium, wherein the steps are represented by computer-readable programming code. Some of the steps of method 1100 may also be computer-implemented using a programmable device, such as a computer-based system. Method 1100 may comprise instructions that, when loaded into a computer-based system, cause the system to execute some of the steps of method 1100. Some of the steps of method 1100 may be computer-implemented using various programming languages, such as "Java," "C," "C++," etc.

For illustrative purposes, method 1100 will be discussed with reference to the steps being performed in system 100. Additionally, while FIG. 11 shows one embodiment of method 1100, other embodiments of method 1100 may contain fewer or more steps. Further, while in some embodiments the steps of method 1100 may be performed as shown in FIG. 11, in other embodiments the steps may be performed in a different order, or certain steps may occur simultaneously with one or more other steps.

In FIG. 11, method 1100 begins at step 1110, which involves providing a manifold 170 having a plurality of vessels 110. Each vessel 110 may include a first chamber 112, a second chamber 114, and a plurality of temperature sensors, 126, 128, 130, and 132 disposed within vessel 110. First chamber 112 may be separated from second chamber 114 by a barrier 116.

Step 1120 involves opening a trigger assembly 118 integrated with barrier 116 to allow a liquid 134 to pass into second chamber 114 from first chamber 112 at a desired or programmed time. As an example, trigger assembly 118 may be opened electronically by controller 160 at the desired or programmed time. Upon transition from first chamber 112 to second chamber 114, liquid 134 combines with a reactant 122 and a catalyst 124 in second chamber 114 to form a chemical reaction that generates hydrogen gas 140. The desired or programmed time may vary depending on the particular system configurations.

Step 1130 involves determining, via a controller 160 connected to temperature sensors 126, 128, 130, and 132, that a temperature within vessel 110 is moving outside a desired temperature range. As previously explained, controller 160 may include a proportional and derivative (PD) control system 164 stored in a non-transitory computer readable medium 162 and configured to keep the temperature within the desired temperature range. PD control system 164 may include a controlling temperature algorithm 166 and a derivative component 168.

Step 1140 involves activating a pump 150, via controller 160, to circulate cooling liquid through at least one thermal regulator 144 within second chamber 114 to keep the temperature within the desired temperature range. As previously explained, the set temperature may be 42° C. with over/undershoots of ±1 or 2° C.; therefore, the desired temperature range in this example may be 41-43 or 40-44° C.

Step 1150 involves opening a pressure relief valve 136 disposed on vessel 110 to allow hydrogen gas 140 to exit when a predetermined pressure is reached. As previously explained, pressure relief valve 136 may be disposed on a safety rupture disc 138. As an example, pressure relief valve 136 may be set to open when the pressure within vessel 110 reaches about 7 atmospheres (ATM).

The pressure within vessel 110 may vary depending on system configurations. In some embodiments, the pressure may be from about 1 ATM to about 10 ATM. Pressurization may allow the chemical reaction to be conducted while suppressing foaming. Prevention of foaming utilizing pressure may also prevent excess reactant volume and the generation of hydrogen gas having excess water vapor. As a result, the size of the vessel used in the system and method can be reduced, and pressurization may aid in generating hydrogen gas that is drier than the ambient environment. The humidity of the hydrogen gas generated by the System and Method for Supplying a Lighter-Than-Air Vehicle with Hydrogen Gas may range between about 10% to about 50% lower than the humidity of an ambient environment. The described system and method may generate up to 330 standard cubic feet (SCF) of hydrogen gas.

Step 1160 involves connecting an LTA vehicle 180 to manifold 170 to supply LTA vehicle 180 with hydrogen gas 140. In some embodiments, LTA vehicle 180 is connected to manifold 170 by a hose (e.g., FIGS. 8 and 9).

Various storage media, such as magnetic computer disks, optical disks, and electronic memories, as well as non-transitory computer-readable storage media and computer program products, can be prepared that can contain information that can direct a device, such as a micro-controller, to implement portions of the above-described systems and/or methods. Once an appropriate device has access to the information and programs contained on the storage media, the storage media can provide the information and programs to the device, enabling the device to perform portions of the above-described systems and/or methods.

EXPERIMENTAL RESULTS

Figure 12:
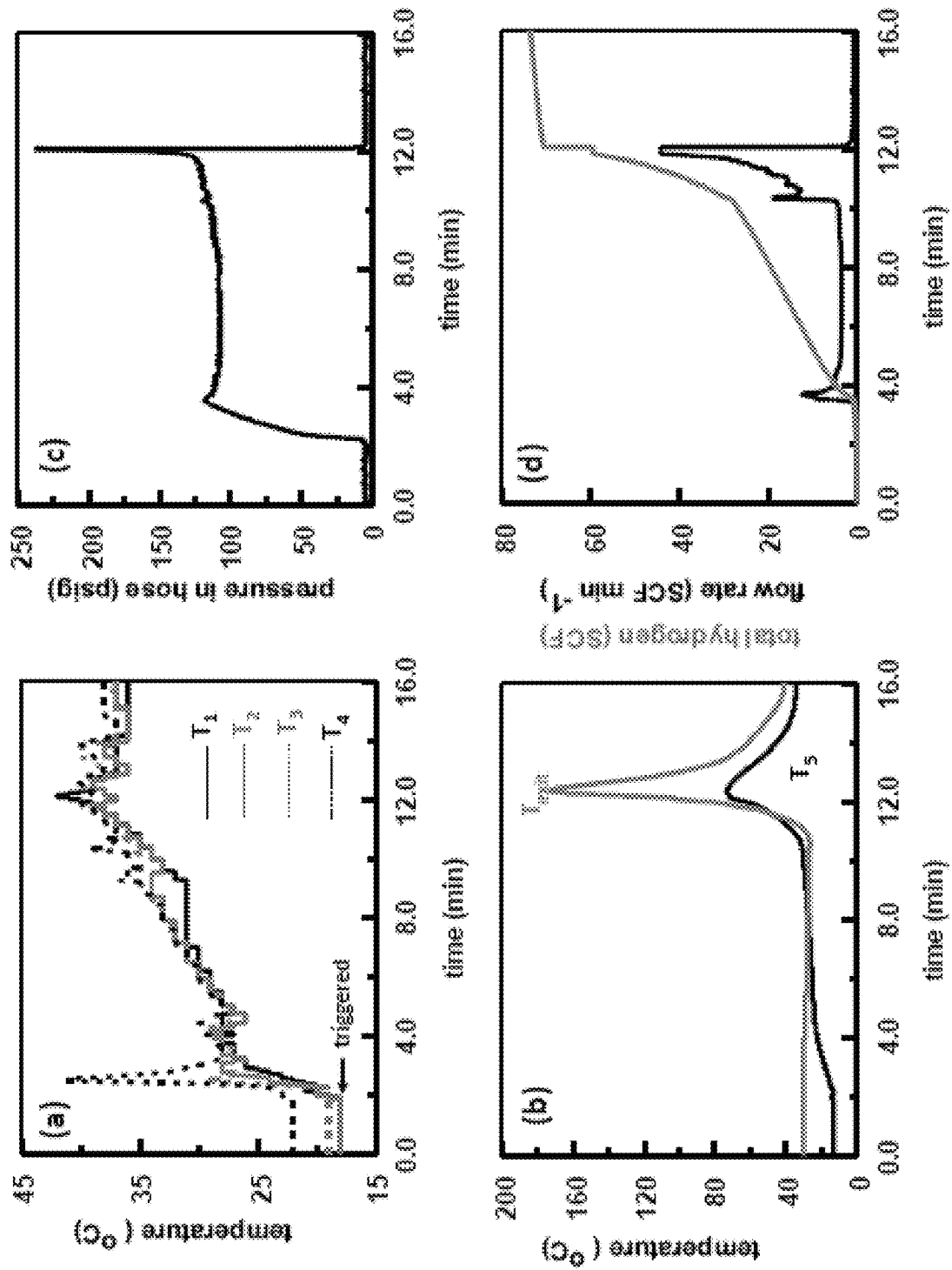
FIGS. 12-25 show graphical results for experiments conducted using configurations in keeping with the various vessel embodiments described herein.

Using Cobalt Chloride as a catalyst and Sodium Borohydride as a reactant in the experiments described below, the following chemical reaction is involved in generating the hydrogen gas:

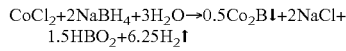
$CoCl_2 + 2NaBH_4 + 3H_2O \rightarrow 0.5Co_2B\downarrow + 2NaCl + 1.5HBO_2 + 6.25H_2\uparrow$ FIG. 12 shows results measured as a function of time for the 330 SCF $H_2$ gas generation, 4.6:1 $H_2O$:$NaBH_4$ ratio run using the configuration shown in FIG. 3. The test was carried out at a temperature of 15° C. The catalyst was 1.25% $CoCl_2$ relative to $NaBH_4$. Part (a) shows temperatures measured in the lower chamber where $T_1$, $T_2$, $T_3$, and $T_4$ were placed 0, 4, 8, and 12 inches (in.) relative to the perforated bottom plate. Thermocouple $T_4$ was used to control the reaction. Part (b) shows temperatures measured in the upper chamber at the trigger assembly, $T_5$ and the gas exiting the hydrogen generation vessel, $T_{exit}$. Part (c) shows measured pressure into the hose. Part (d) shows measured flow rate and total hydrogen gas.

Figure 13:
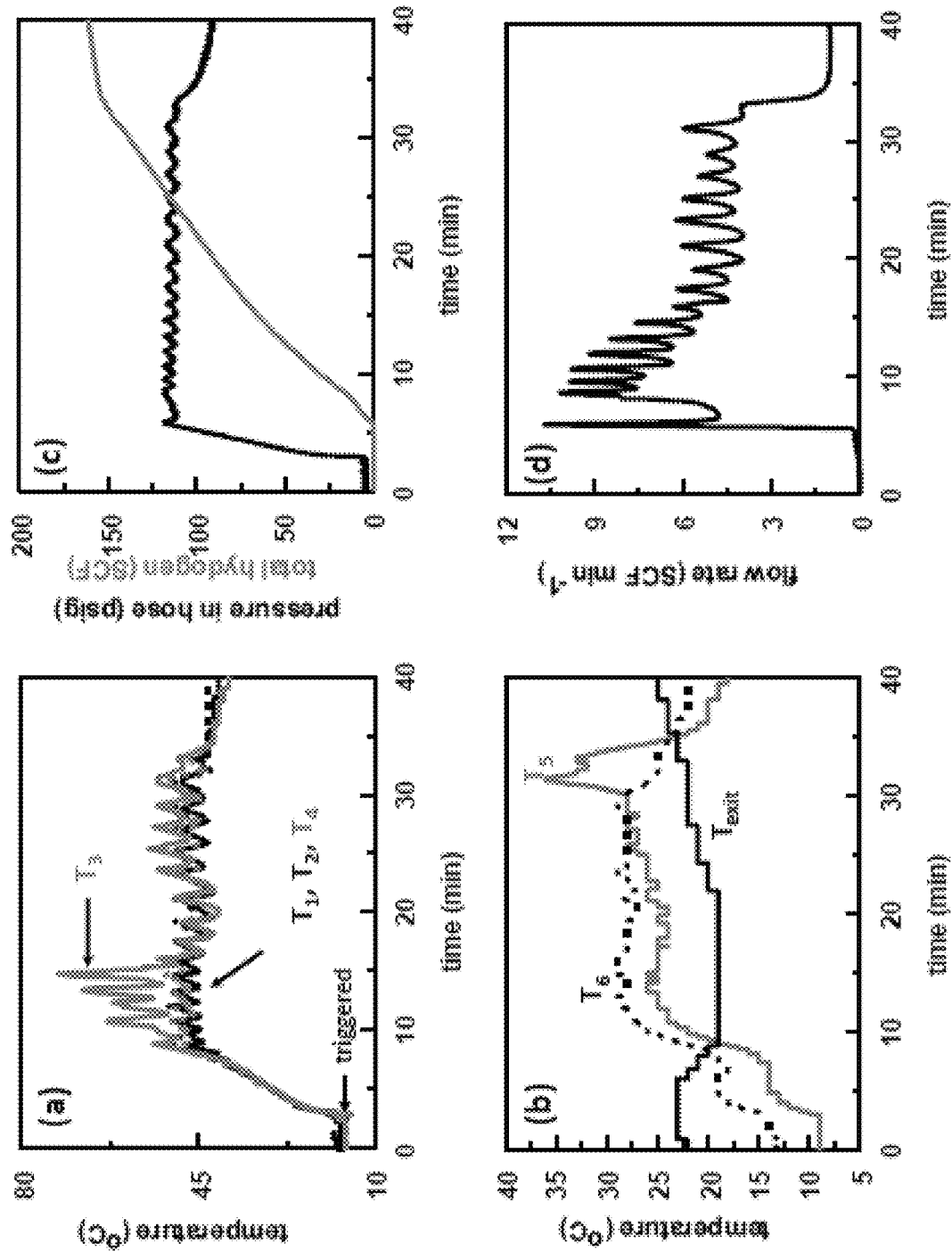

FIG. 13 shows results measured as a function of time for the 165 SCF $H_2$ gas generation, 4.6:1 $H_2O$:$NaBH_4$ ratio run using the configuration shown in FIG. 3. The test was carried out at a temperature of 15° C. The catalyst was 2.00% $CoCl_2$ relative to $NaBH_4$. Part (a) shows temperatures measured in the lower chamber where $T_1$, $T_2$, $T_3$, and $T_4$ were placed 0, 4, 10.5, and 8 in. relative to the perforated bottom plate, FIG. 3. Thermocouple $T_2$ was used to control the reaction. Part (b) shows temperatures measured in the upper chamber at the trigger assembly, $T_5$, and 6 in. above the trigger assembly, $T_6$; and the gas exiting the hydrogen generation vessel, $T_{exit}$. Part (c) shows measured pressure into the hose and total hydrogen gas. Part (d) shows measured flow rate.

Figure 14:
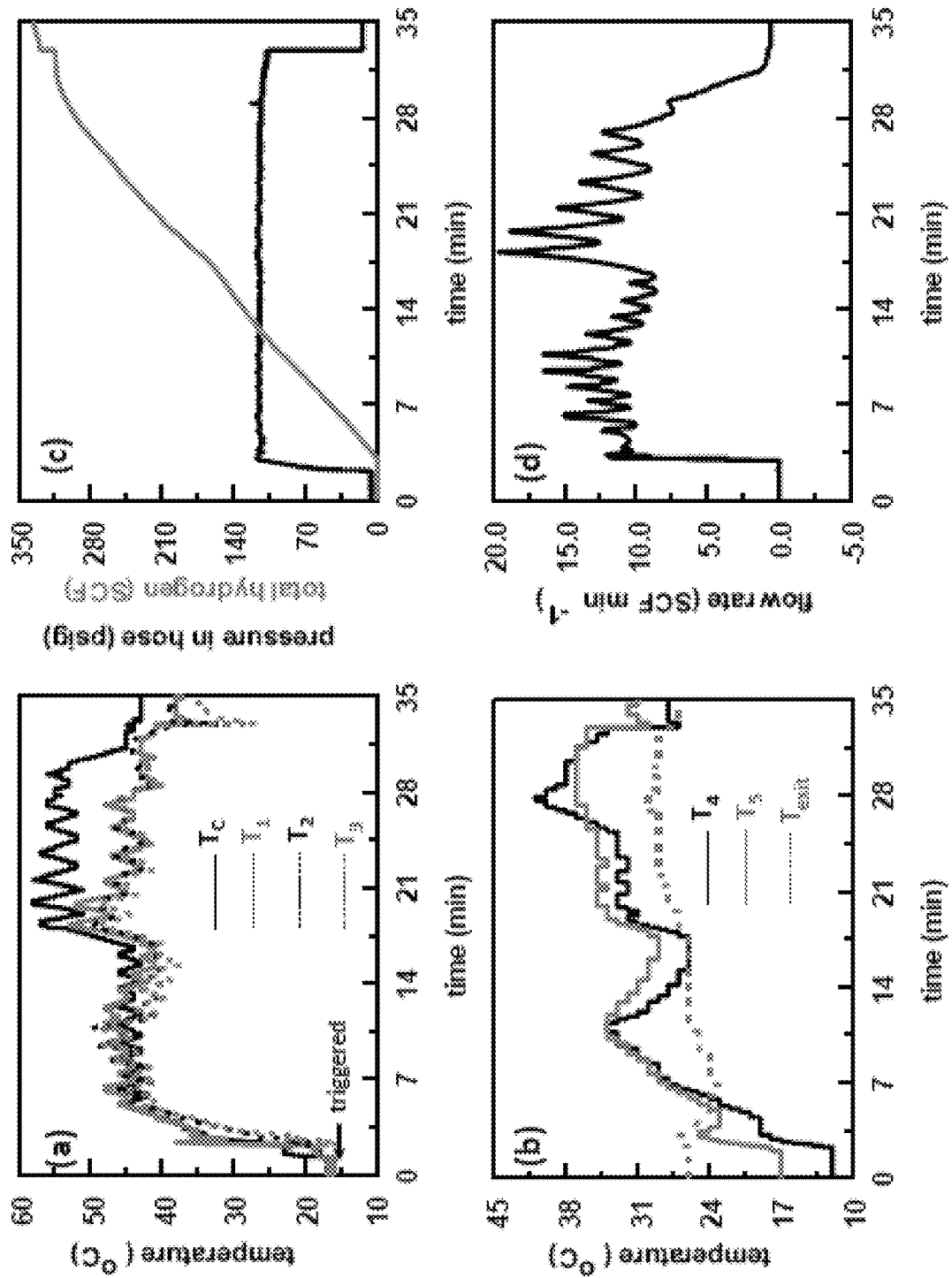

FIG. 14 shows results measured as a function of time for the 330 SCF $H_2$ gas generation, 4.6:1 $H_2O$:$NaBH_4$ ratio run using the configuration shown in FIG. 5. See FIG. 26 for experimental conditions. Part (a) shows temperatures measured in the lower chambers. Part (b) shows temperatures measured in the upper chamber at the trigger assembly, $T_4$; 6 in. above $T_4$, $T_5$; and the gas exiting the hydrogen generation vessel, $T_{exit}$. Part (c) shows measured pressure into the hose and total hydrogen gas. Part (d) shows measured flow rate.

Figure 15:
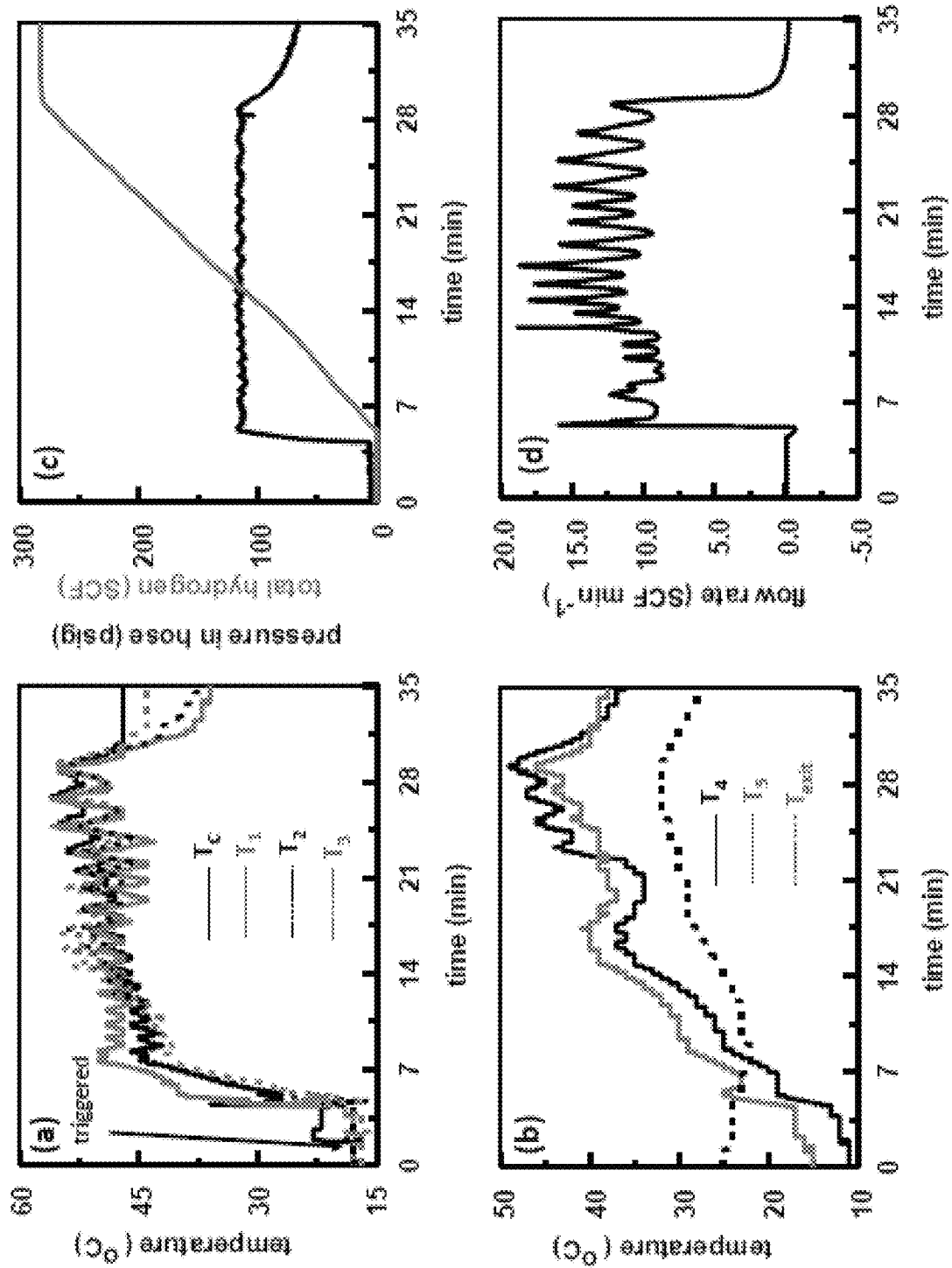

FIG. 15 shows results measured as a function of time for the 330 SCF $H_2$ gas generation, 4.6:1 $H_2O$:$NaBH_4$ ratio run using the configuration shown in FIG. 5. See FIG. 26 for experimental conditions. Part (a) shows temperatures measured in the lower chambers. Part (b) shows temperatures measured in the upper chamber at the trigger assembly, $T_4$; 6 in. above $T_4$, $T_5$; and the gas exiting the hydrogen generation vessel, $T_{exit}$. Part (c) shows measured pressure into the hose and total hydrogen gas. Part (d) shows measured flow rate.

Figure 16:
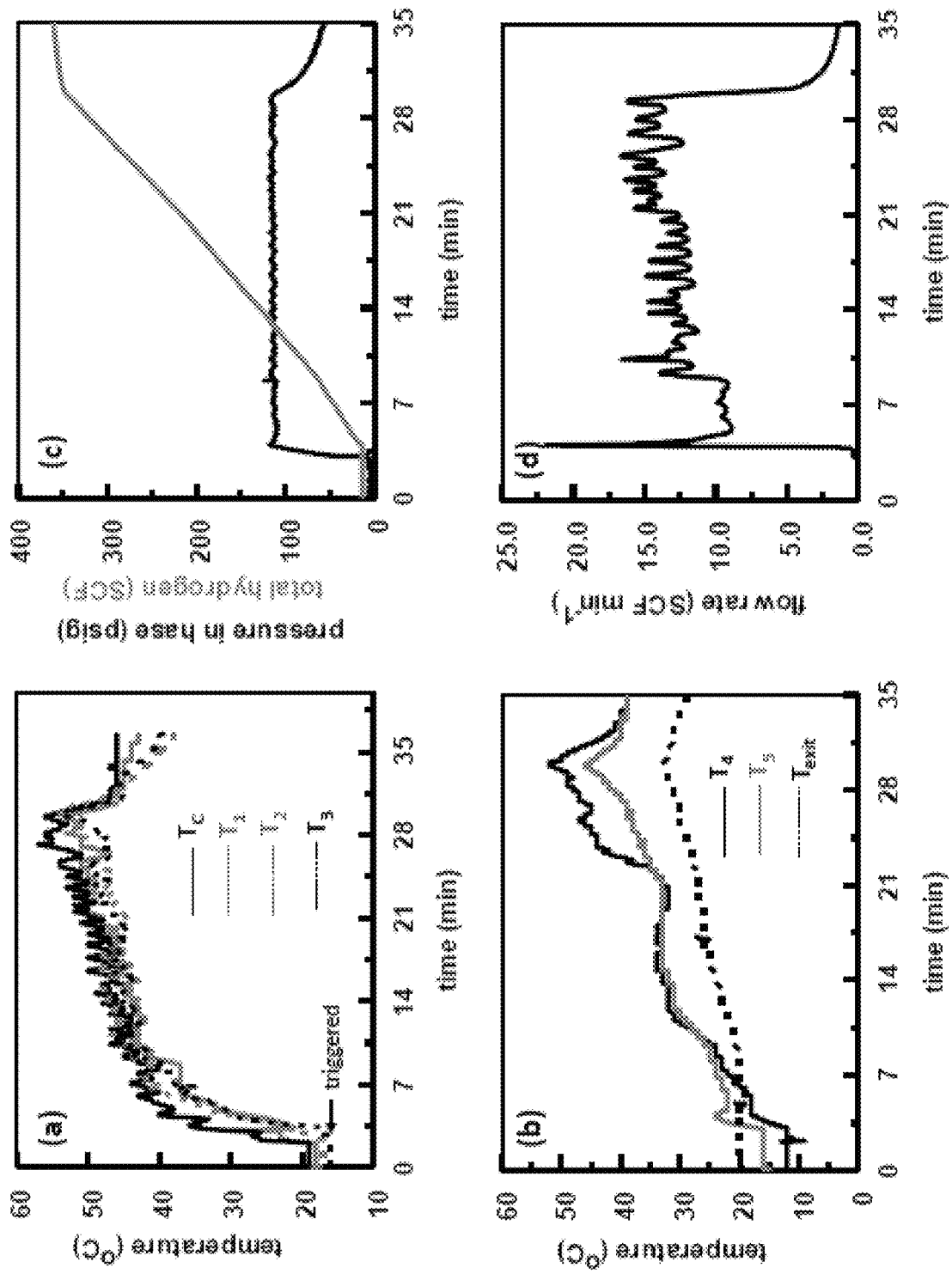

FIG. 16 shows results measured as a function of time for the 330 SCF $H_2$ gas generation, 4.6:1 $H_2O$:$NaBH_4$ ratio run using the configuration shown in FIG. 5. See FIG. 26 for experimental conditions. Part (a) shows temperatures measured in the lower chambers. Part (b) shows temperatures measured in the upper chamber at the trigger assembly, $T_4$; 6 in above $T_4$, $T_5$; and the gas exiting the hydrogen generation vessel, $T_{exit}$. Part (c) shows measured pressure into the hose and total hydrogen gas. Part (d) shows measured flow rate.

Figure 17:
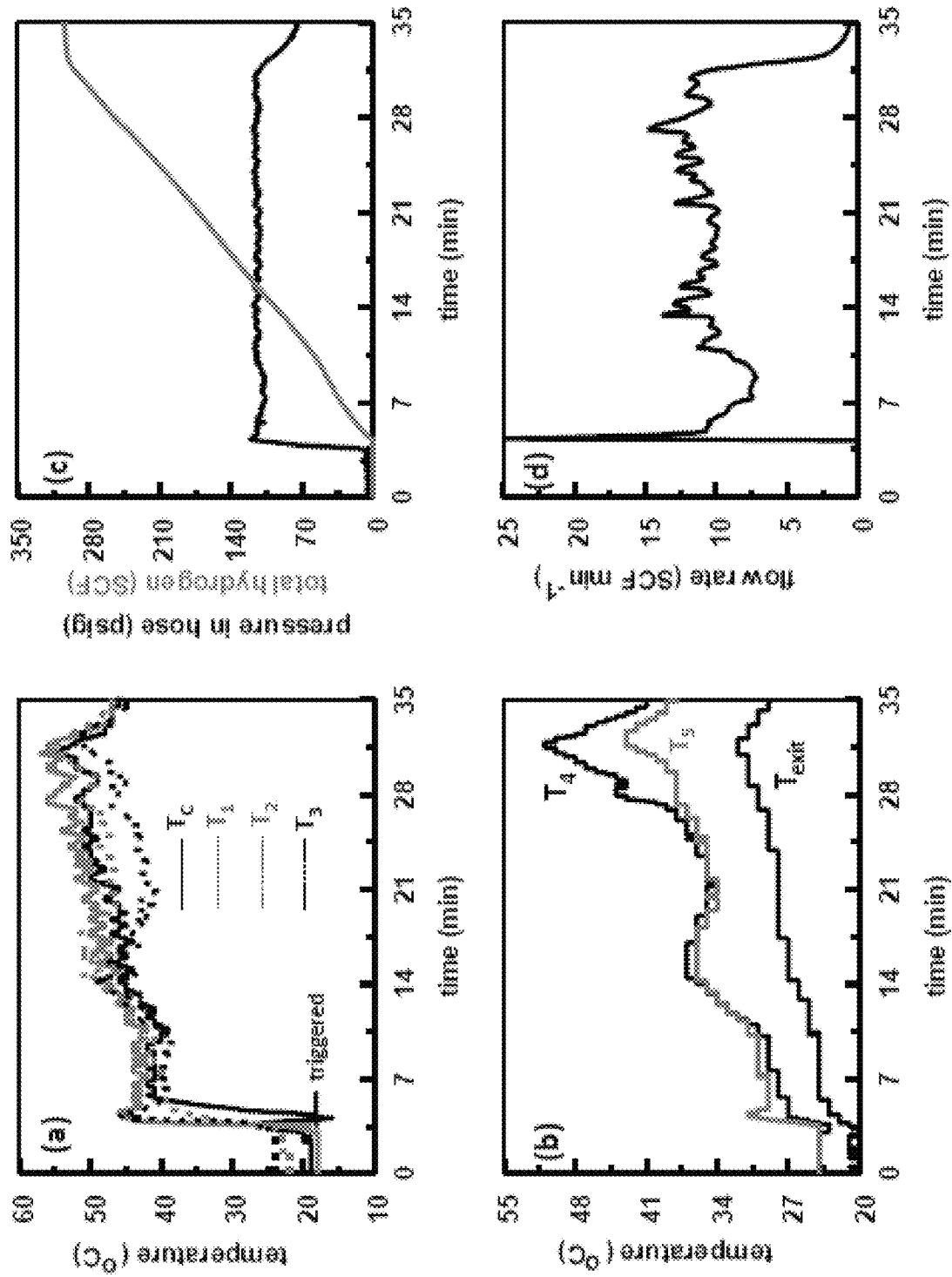

FIG. 17 shows results measured as a function of time for the 330 SCF $H_2$ gas generation, 4.6:1 $H_2O$:$NaBH_4$ ratio run using the configuration shown in FIG. 5. See FIG. 26 for experimental conditions. Part (a) shows temperatures measured in the lower chambers. Part (b) shows temperatures measured in the upper chamber at the trigger assembly, $T_4$; 6 in above $T_4$, $T_5$; and the gas exiting the hydrogen generation vessel, $T_{exit}$. Part (c) shows measured pressure into the hose and total hydrogen gas. Part (d) shows measured flow rate.

Figure 18:
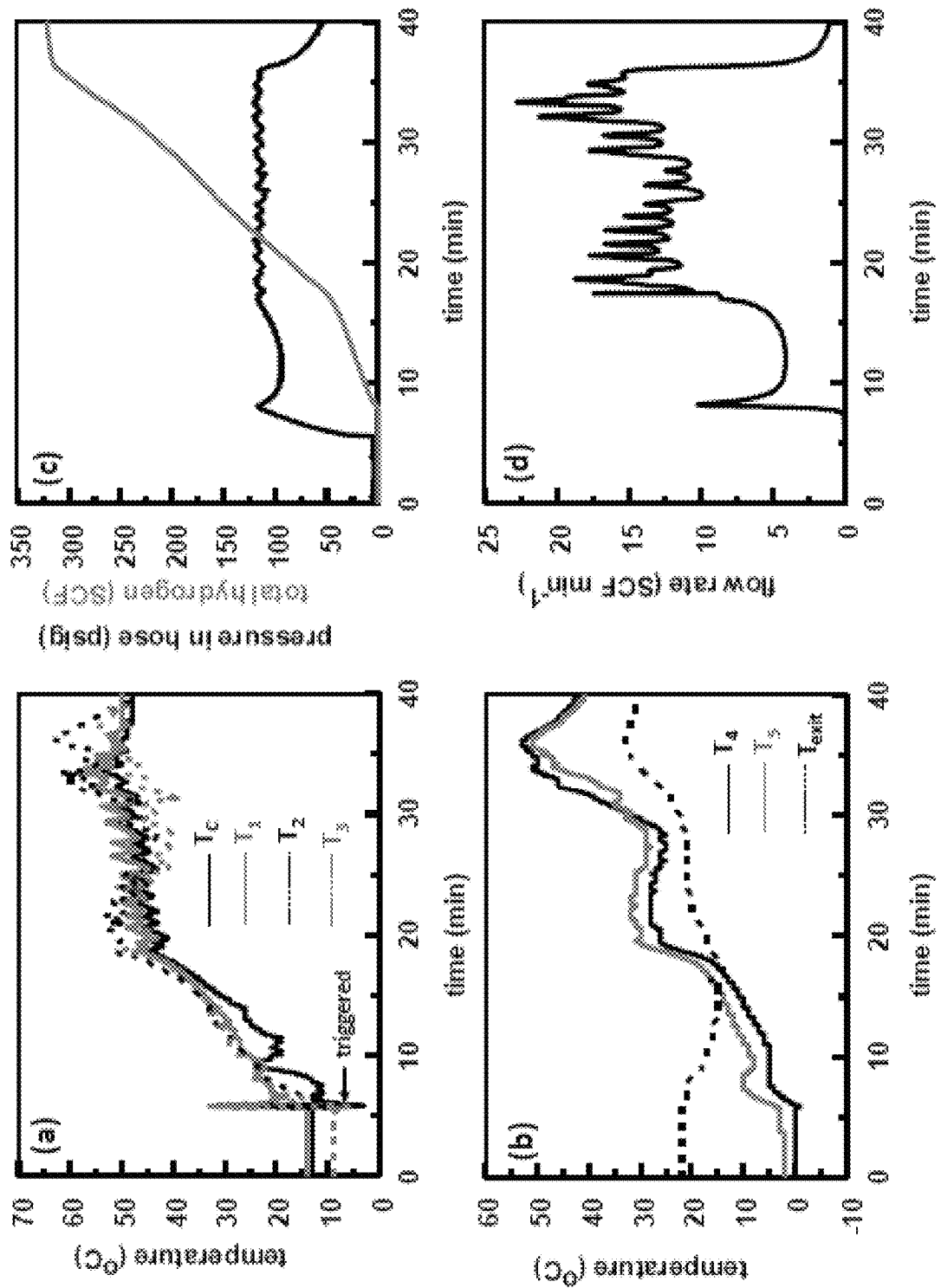

FIG. 18 shows results measured as a function of time for the 330 SCF $H_2$ gas generation, 4.6:1 $H_2O$:$NaBH_4$ ratio run using the configuration shown in FIG. 5. See FIG. 26 for experimental conditions. Part (a) shows temperatures measured in the lower chambers. Part (b) shows temperatures measured in the upper chamber at the trigger assembly, $T_4$; 6 in above $T_4$, $T_5$; and the gas exiting the hydrogen generation vessel, $T_{exit}$. Part (c) shows measured pressure into the hose and total hydrogen gas. Part (d) shows measured flow rate.

Figure 19:
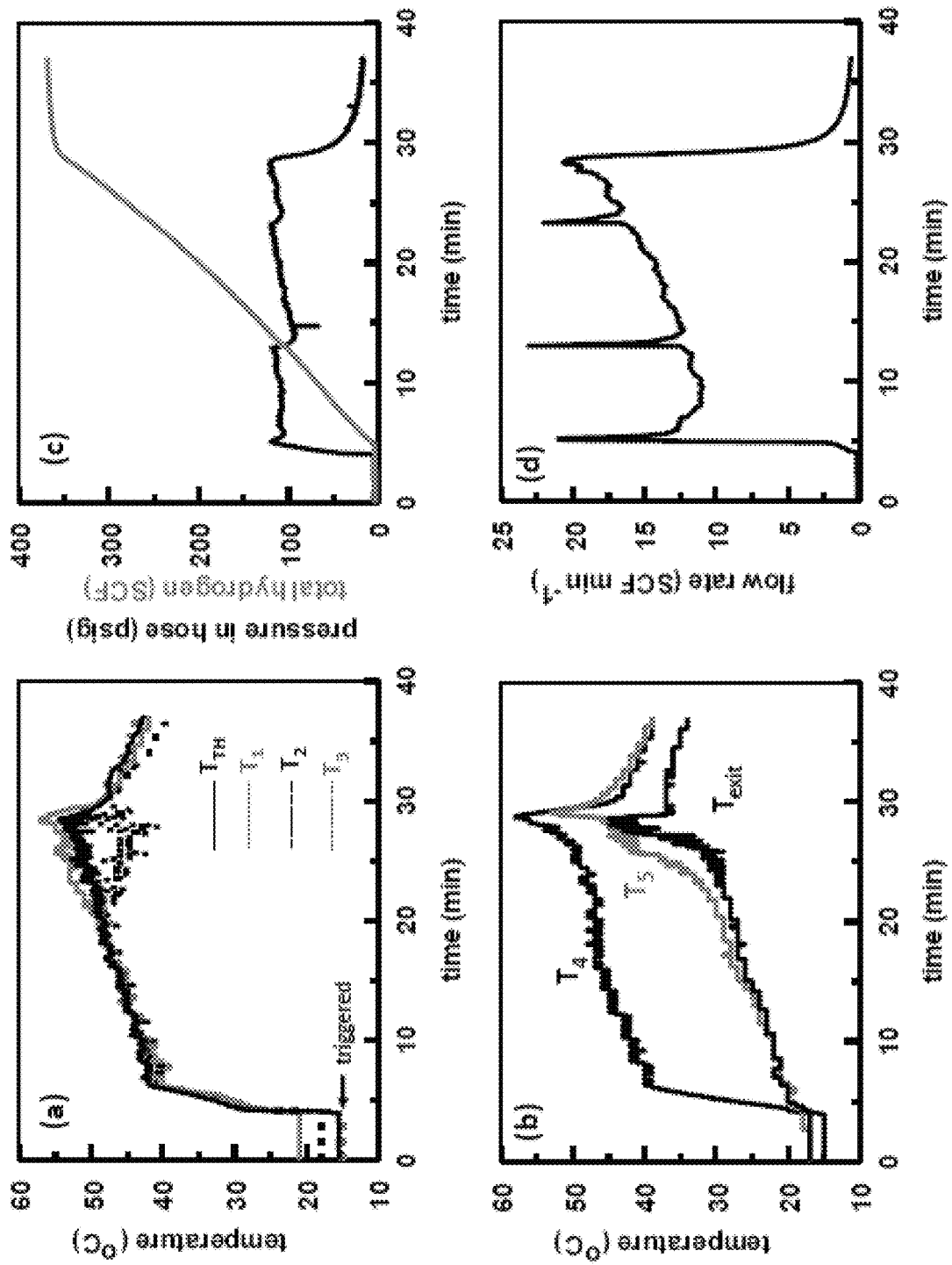

FIG. 19 shows results measured as a function of time for the 330 SCF $H_2$ gas generation, 4.6:1 $H_2O$:$NaBH_4$ ratio run using the configuration shown in FIG. 5. See FIG. 26 for experimental conditions. Part (a) shows temperatures measured in the lower chambers. Part (b) shows temperatures measured in the upper chamber at the trigger assembly, $T_5$, and the gas exiting the hydrogen generation vessel, $T_{exit}$. Part (c) shows measured pressure into the hose and total hydrogen gas. Part (d) shows measured flow rate. Spikes in the flow rate are caused by sticking of the pressure release valve.

Figure 20:
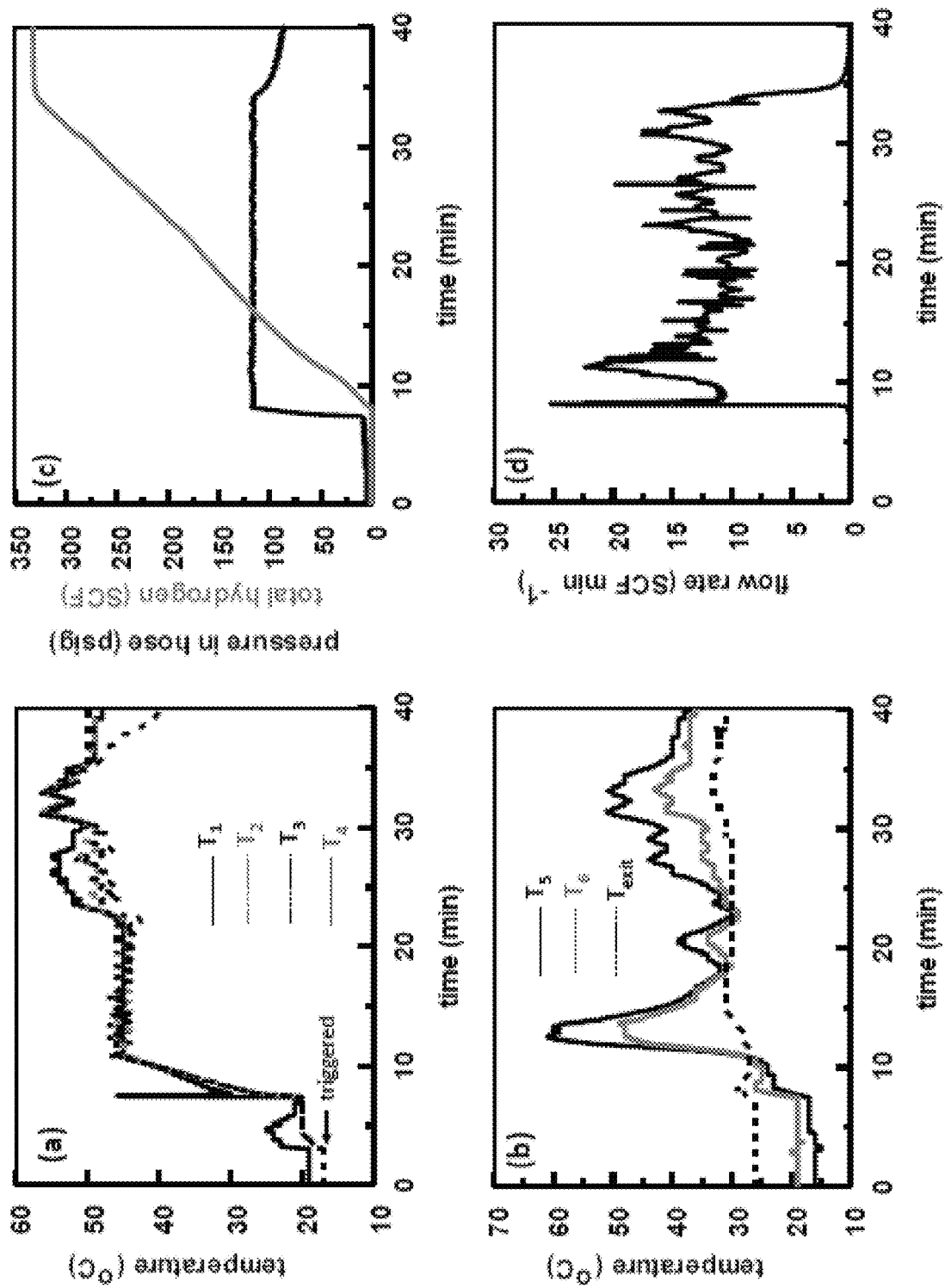

FIG. 20 shows results measured as a function of time for the 330 SCF $H_2$ gas generation, 4.6:1 $H_2O$:$NaBH_4$ ratio run using the configuration shown in FIG. 4. Part (a) shows temperatures measured in the lower chamber. Part (b) shows temperatures measured in the upper chamber at the trigger assembly, $T_5$; 6 in. above $T_5$, $T_6$; and the gas exiting the hydrogen generation vessel, $T_{exit}$. Part (c) shows measured pressure into the hose and total hydrogen gas. Part (d) shows measured flow rate.

Figure 21:
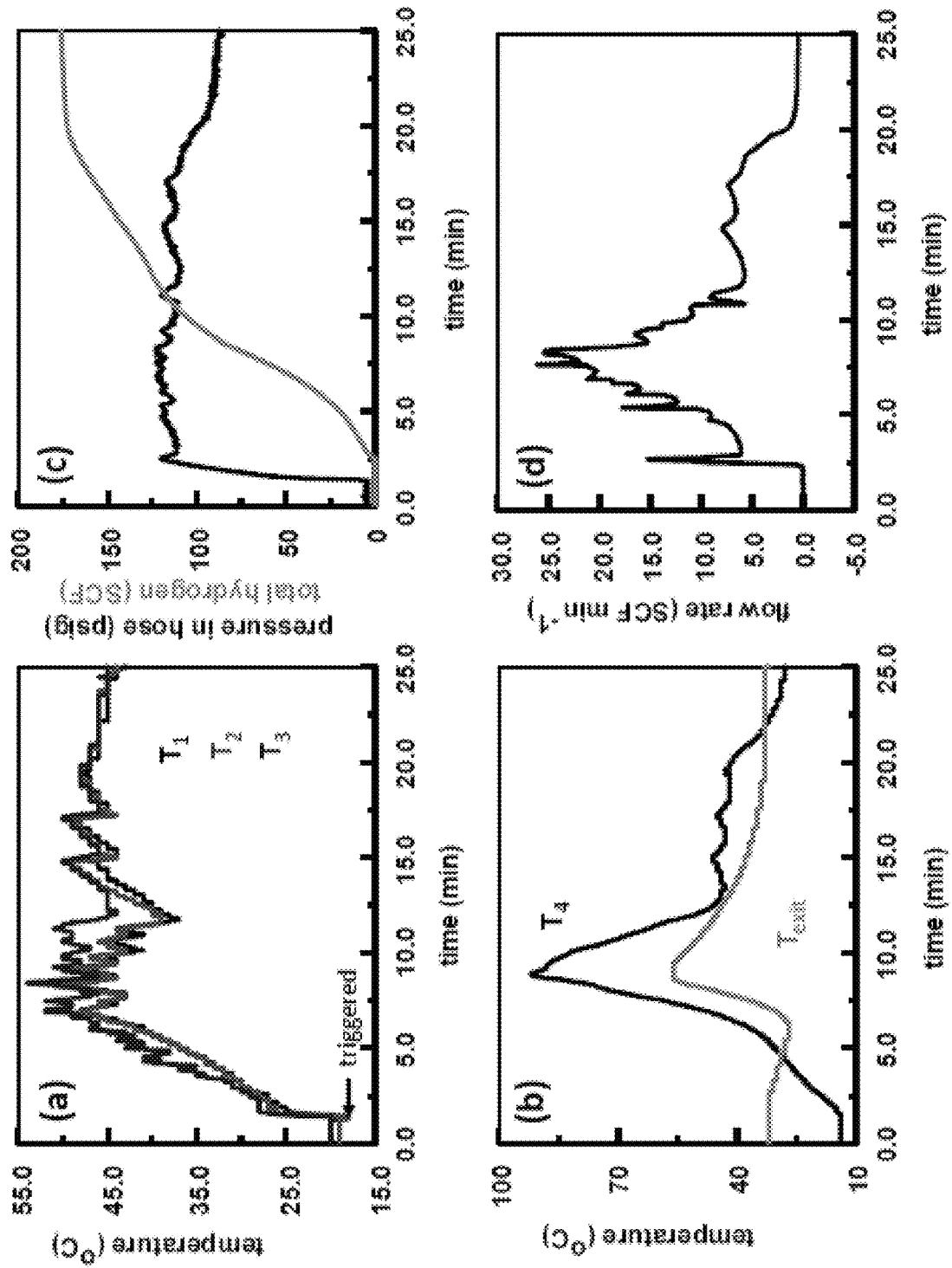

FIG. 21 shows results measured as a function of time for the 165 SCF $H_2$ gas generation, 9.3:1 $H_2O$:$NaBH_4$ ratio run using the two chamber, one set of cooling coils configuration, FIG. 3. The test was carried out at a temperature of 15° C. The catalyst was 3.25% $CoCl_2$ relative to $NaBH_4$. Part (a) shows temperatures measured in the lower chamber where $T_1$, $T_2$ and $T_3$ were placed 4, 8, and 12 in. relative to the perforated bottom plate, FIG. 3. Thermocouple $T_3$ was used to control the reaction. Part (b) shows temperatures measured in the upper chamber at the trigger assembly, $T_4$, and the gas exiting the hydrogen generation vessel, $T_{exit}$. Part (c) shows measured pressure in the hose and total hydrogen gas. Part (d) shows measured flow rate.

Figure 22:
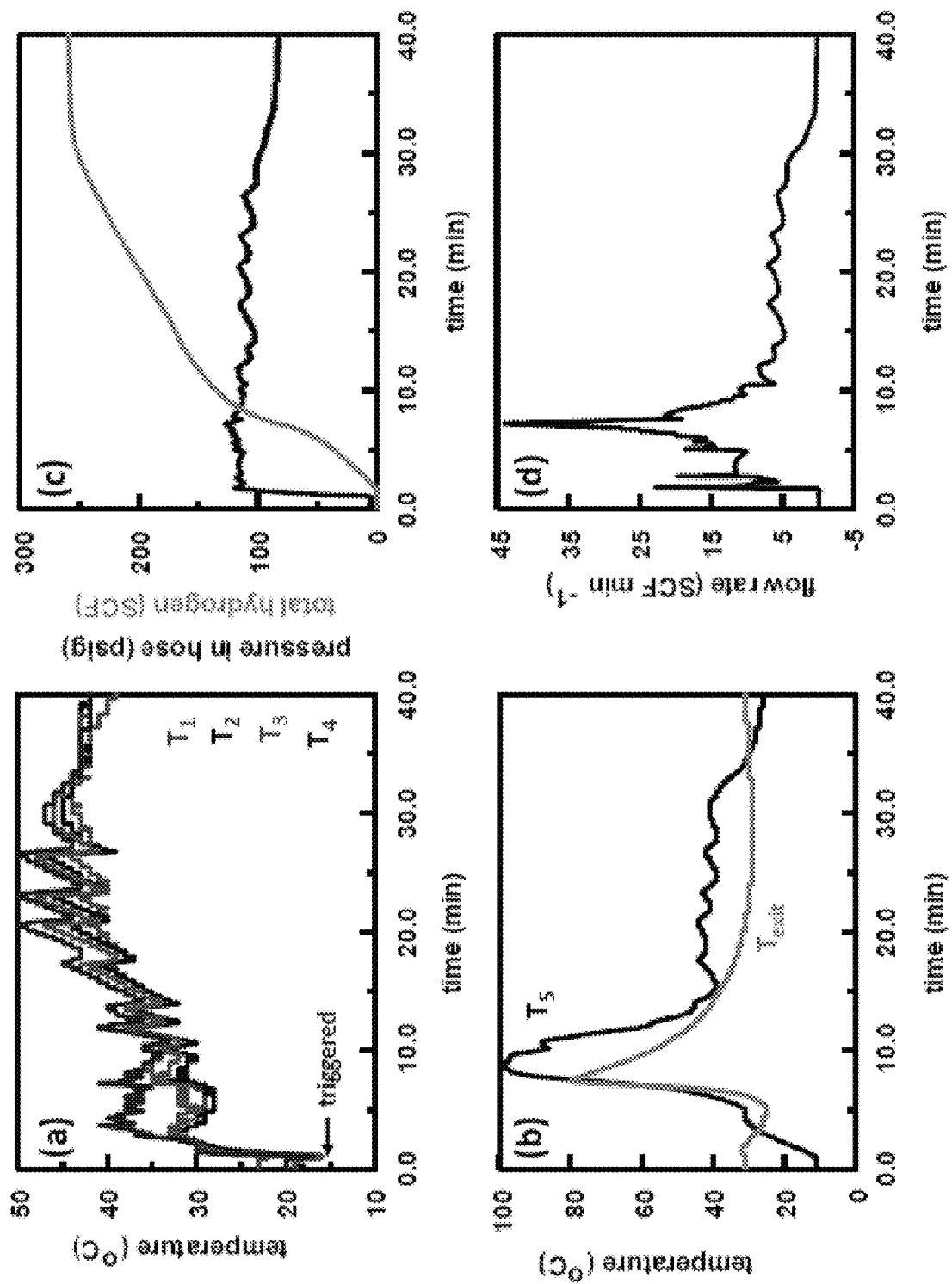

FIG. 22 shows results measured as a function of time for the 247.5 SCF $H_2$ gas generation, 6.2:1 $H_2O$:$NaBH_4$ ratio run using the two chamber, one set of cooling coils configuration, FIG. 3. The test was carried out at a temperature of 15° C. The catalyst was 2.75% $CoCl_2$ relative to $NaBH_4$. Part (a) shows temperatures measured in the lower chamber where $T_1$, $T_2$, $T_3$, and $T_4$ were placed 0, 4, 8, and 12 in. relative to the perforated bottom plate, FIG. 3. Thermocouple $T_4$ was used to control the reaction. Part (b) shows temperatures measured in the upper chamber at the trigger assembly, $T_5$; and the gas exiting the hydrogen generation vessel, $T_{exit}$. Part (c) shows measured pressure in the hose and total hydrogen gas. Part (d) shows measured flow rate.

Figure 23:
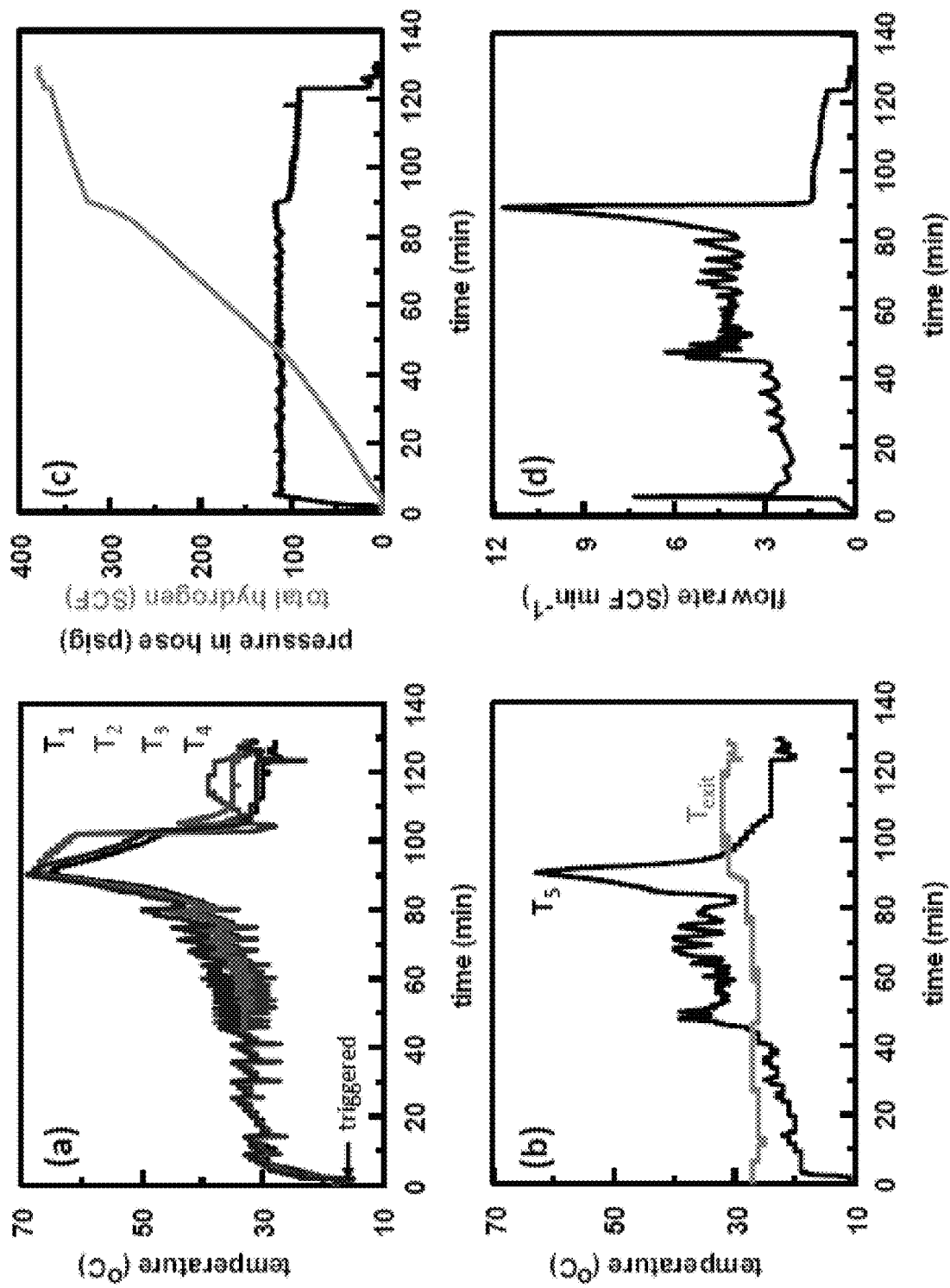

FIG. 23 shows results measured as a function of time for the 247.5 SCF $H_2$ gas generation, 4.6:1 $H_2O$:$NaBH_4$ ratio run using the two chamber, one set of cooling coils configuration, FIG. 3. The test was carried out at a temperature of 15° C. The catalyst was 1.25% $CoCl_2$ relative to $NaBH_4$. Part (a) shows temperatures measured in the lower chamber where $T_1$, $T_2$, $T_3$, and $T_4$ were placed 0, 4, 8, and 10.5 in. relative to the perforated bottom plate, FIG. 3. Thermocouple $T_4$ was used to control the reaction. Part (b) shows temperatures measured in the upper chamber at the trigger assembly, $T_5$ and the gas exiting the hydrogen generation vessel, $T_{exit}$. Part (c) shows measured pressure in the hose and total hydrogen gas. Part (d) shows measured flow rate.

Figure 24:
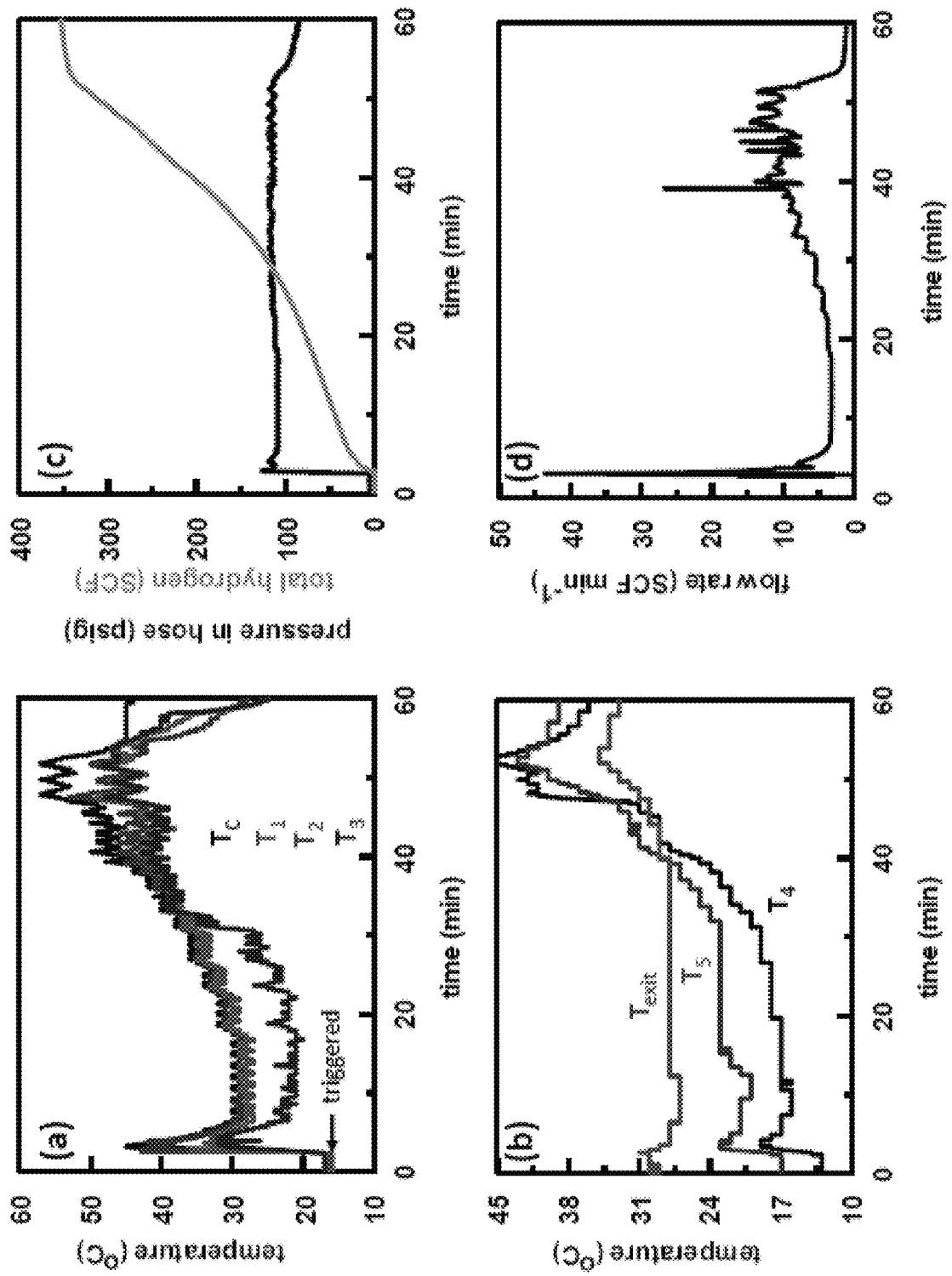

FIG. 24 shows results measured as a function of time for the 330 SCF $H_2$ gas generation, 4.6:1 $H_2O$:$NaBH_4$ ratio run using the three chamber, two sets of cooling coils configuration, FIG. 5. The test was carried out at a temperature of 15° C. The catalyst was 2.25% $CoCl_2$ relative to $NaBH_4$. Part (a) shows temperatures measured in the lower chamber. See FIG. 26 for experimental conditions. Part (b) shows temperatures measured in the upper chamber at the trigger assembly, $T_4$; 6 in. above $T_4$, $T_5$ and the gas exiting the hydrogen generation vessel, $T_{exit}$. Part (c) shows measured pressure in the hose and total hydrogen gas. Part (d) shows measured flow rate.

Figure 25:
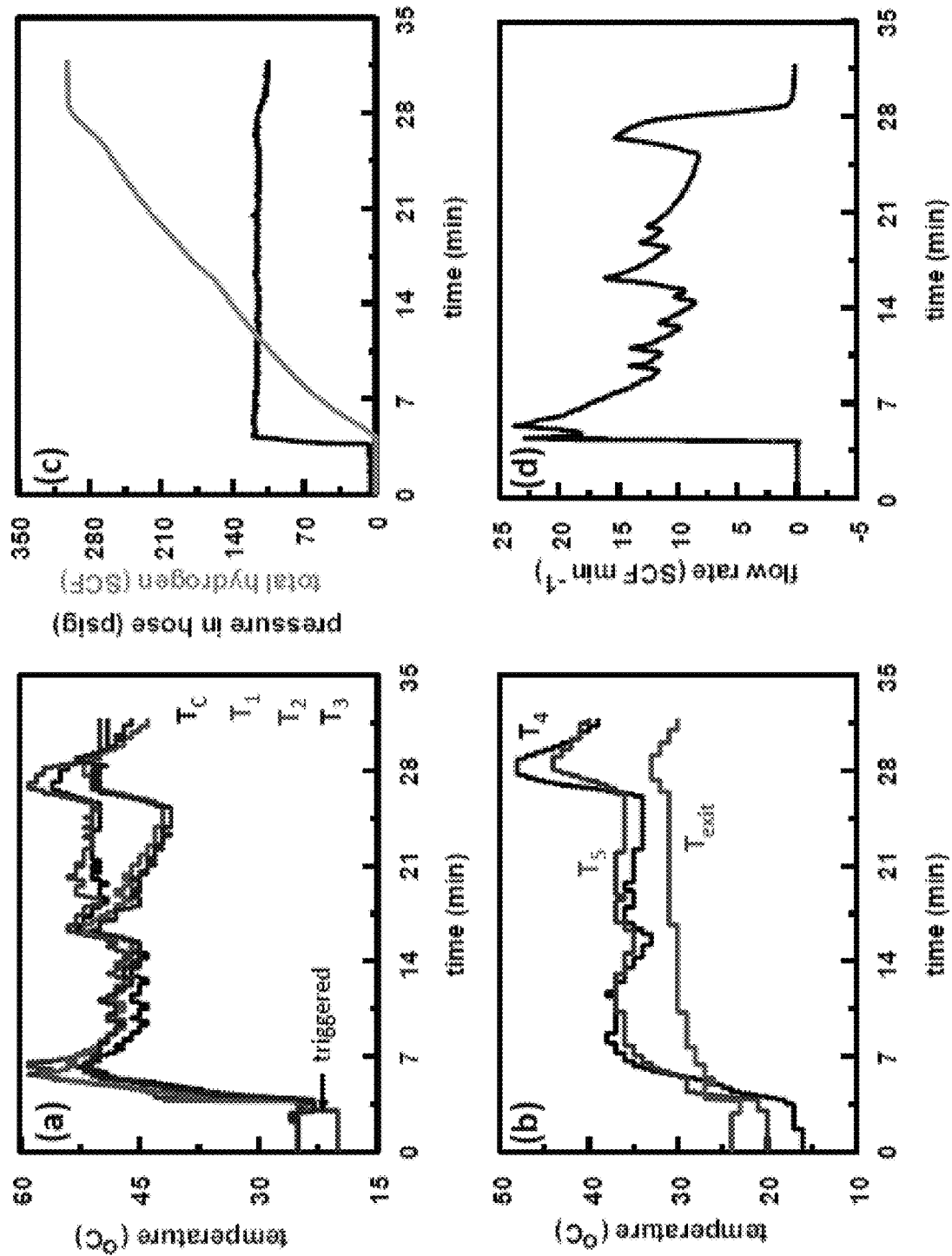

FIG. 25 shows results measured as a function of time for the 330 SCF $H_2$ gas generation, 4.6:1 $H_2O$:$NaBH_4$ ratio run using the three chamber, two sets of cooling coils configuration, FIG. 5. See FIG. 26 for experimental conditions. Part (a) shows temperatures measured in the lower chambers. Part (b) shows temperatures measured in the upper chamber at the trigger assembly, $T_4$; 6 in. above $T_4$, $T_5$; and the gas exiting the hydrogen generation vessel, $T_{exit}$. Part (c) shows measured pressure into the hose and total hydrogen gas. Part (d) shows measured flow rate.

The use of any examples, or exemplary language ("e.g.," "such as," etc.), provided herein is merely intended to better illuminate and is not intended to pose a limitation on the scope of the subject matter unless otherwise claimed. No language in the specification should be construed as indicating that any non-claimed element is essential.

Many modifications and variations of the System and Method for Supplying a Lighter-Than-Air Vehicle with Hydrogen Gas are possible in light of the above description. Within the scope of the appended claims, the embodiments described herein may be practiced otherwise than as specifically described. The scope of the claims is not limited to the implementations and embodiments disclosed herein but extends to other implementations and embodiments as may be contemplated by those having ordinary skill in the art.

What is claimed is:

1. A system for generating hydrogen gas comprising:
   a vessel that includes:
   a first chamber for holding liquid water;
   a second chamber, wherein the first chamber is separated from the second chamber by a barrier;
   a trigger valve integrated into the barrier, the trigger valve opening to transition the liquid water from the first chamber to the second chamber and thereby initiate generating the hydrogen gas;
   a reactant container disposed within the second chamber for containing a solid reactant, wherein the hydrogen gas is generated from a chemical reaction between the liquid water and the solid reactant when the liquid water contacts the solid reactant inside the reactant container;
   a thermal regulator surrounding the reactant container within the second chamber for controlling a pre-reaction temperature of the liquid water passing though the thermal regulator before the liquid water reaches the solid reactant in the reactant container and reacts in the chemical reaction;
   a pressure relief valve disposed on the vessel and configured to allow the generated hydrogen gas to exit the vessel at a predetermined pressure; and
   a temperature sensor disposed in the second chamber for sensing a sensed temperature inside the second chamber; and
   a controller adapted to control a flow of a coolant through the thermal regulator for limiting the sensed temperature to a set temperature so that the generated hydrogen gas exiting the vessel at the predetermined pressure attains a substantially constant flow rate during the chemical reaction.

2. The system of claim 1, wherein the trigger valve opens at a desired time allowing the liquid water to combine with the solid reactant in the second chamber and undergo the chemical reaction that produces the generated hydrogen gas.

3. The system of claim 1, wherein a humidity of the generated hydrogen gas is between a range of about 10% to about 50% lower than an ambient humidity.

4. The system of claim 1, wherein the solid reactant is chosen from at least one of Lithium Borohydride, Sodium Borohydride, and Magnesium Borohydride.

5. The system of claim 1, wherein an amount of the hydrogen gas generated by the vessel is at least 300 standard cubic feet.

6. The system of claim 1, wherein the reactant container further comprises a lid and at least one wall having a plurality of perforations, the lid configured to inhibit the liquid water from directly entering the reactant container and to instead direct the liquid water to pass through the thermal regulator and through the perforations before reaching the solid reactant in the reactant container.

7. The system of claim 1, wherein the controller includes a proportional and derivative (PD) control system stored in a non-transitory computer readable medium and configured to keep the sensed temperature within a desired temperature range around the set temperature.

8. The system of claim 1 further comprising:
   a manifold including a plurality of vessels including the vessel, each of the vessels being identical to the vessel, wherein the controller is adapted to control a respective flow of the coolant through the thermal regulator of each of the vessels for limiting the sensed temperature sensed in each of the vessels to the set temperature, such that the hydrogen gas exiting at the predetermined pressure from the vessels attains a combined flow rate that is substantially constant.

9. The system of claim 8 further comprising:
   a lighter-than-air (LTA) vehicle, wherein the LTA vehicle is connected to the manifold for supplying the hydrogen gas generated in the vessels to the LTA vehicle.

10. The system of claim 9, further comprising:
    a catalyst disposed within the second chamber but initially outside the reactant container, wherein the liquid water carries the catalyst into the reactant container via a plurality of perforations in at least one wall of the reactant container to participate in the chemical reaction within the reactant container among the liquid water, the solid reactant, and the catalyst.

11. The system of claim 10, wherein the catalyst is chosen from at least one of Ruthenium Chloride, Rhodium Chloride, Cobalt Chloride, and Chloroplatinic acid.

12. The system of claim 1, wherein:
the reactant container includes at least one wall having a plurality of perforations,
the thermal regulator includes tubing surrounding the reactant container and through which flows the flow of the coolant, wherein the liquid water reaching the solid reactant passes through the thermal regulator and through the perforations in the at least one wall of the reactant container, and
the controller is adapted to control the flow of the coolant through the tubing of the thermal regulator.

13. The system of claim 1, further comprising a pump for pumping the flow of the coolant through tubing of the thermal regulator surrounding the reactant container, wherein the controller is adapted to activate the pump for controlling the flow of the coolant through the tubing of the thermal regulator.

14. A method for generating hydrogen gas comprising:
providing a manifold including a plurality of vessels, wherein each vessel includes a first chamber and a second chamber, the first chamber holding liquid water and separated from the second chamber by a barrier, the second chamber having within a reactant container containing a solid reactant;
opening a trigger valve integrated with the barrier of each vessel to transition the liquid water from the first chamber to the second chamber at a desired time for generating the hydrogen gas;
passing the liquid water through a thermal regulator for controlling a pre-reaction temperature of the liquid water before the liquid water reacts in a chemical reaction upon the liquid water reaching the solid reactant in the reactant container of each vessel, the thermal regulator surrounding the reactant container within the second chamber of each vessel;
combining the liquid water with the solid reactant and a catalyst in the reactant container within the second chamber of each vessel to generate the hydrogen gas from the chemical reaction among the liquid water, the solid reactant, and the catalyst;
opening a pressure relief valve disposed on each vessel to allow the generated hydrogen gas to exit the vessel at a predetermined pressure;
sensing a sensed temperature inside the second chamber of each vessel with a temperature sensor disposed in the second chamber;
controlling a flow of a coolant through the thermal regulator of each vessel for limiting the sensed temperature to a set temperature so that the generated hydrogen gas exiting the vessels at the predetermined pressure attains a substantially constant flow rate during the chemical reaction; and
connecting a lighter-than-air (LTA) vehicle to the manifold to supply the LTA vehicle with the hydrogen gas generated in the vessels.

15. The method of claim 14, further comprising:
determining, via a controller connected to the temperature sensor and a plurality of additional temperature sensors within each vessel, that the sensed temperature within each vessel is moving outside a desired temperature range around the set temperature, wherein the controller includes a proportional and derivative (PD) control system stored in a non-transitory computer readable medium and configured to keep the sensed temperature within the desired temperature range.

16. The method of claim 14, wherein a humidity of the hydrogen gas is between a range of about 10% to about 50% lower than an ambient humidity, and
wherein the pressure relief valve is disposed on a safety rupture disc on the vessel.

17. The method of claim 14, wherein the solid reactant is within the reactant container including a lid and at least one wall having a plurality of perforations, the lid configured to inhibit the liquid water from directly entering the reactant container and to instead direct the liquid water to pass through the thermal regulator and through the perforations before reaching the solid reactant in the reactant container.

18. The method of claim 14, wherein the solid reactant is chosen from at least one of Lithium Borohydride, Sodium Borohydride, and Magnesium Borohydride.

19. The method of claim 14, wherein the catalyst is chosen from at least one of Ruthenium Chloride, Rhodium Chloride, Cobalt Chloride, and Chloroplatinic acid.

20. The method of claim 14, wherein an amount of the hydrogen gas generated by each vessel is at least 300 standard cubic feet.

* * * * *